(12) United States Patent
Shen et al.

(10) Patent No.: US 12,254,763 B2
(45) Date of Patent: Mar. 18, 2025

(54) INFORMATION FUSION METHOD AND SYSTEM

(71) Applicant: Shenzhen Yinwang Intelligent Technologies Co., Ltd., Shenzhen (CN)

(72) Inventors: Zeshu Shen, Shenzhen (CN); Nengwu Xiang, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 152 days.

(21) Appl. No.: 17/729,834

(22) Filed: Apr. 26, 2022

(65) Prior Publication Data

US 2022/0252420 A1 Aug. 11, 2022

Related U.S. Application Data

(63) Continuation of application No. PCT/CN2020/101542, filed on Jul. 13, 2020.

(30) Foreign Application Priority Data

Oct. 26, 2019 (CN) .......................... 201911026822.6
Mar. 19, 2020 (CN) .......................... 202010196398.6

(51) Int. Cl.
*G06V 10/25* (2022.01)
*G01C 21/00* (2006.01)
(Continued)

(52) U.S. Cl.
CPC ....... *G08G 1/0112* (2013.01); *G01C 21/3667* (2013.01); *G01C 21/387* (2020.08);
(Continued)

(58) Field of Classification Search
CPC .. G08G 1/0112; G08G 1/0967; G08G 1/0116; G08G 1/164; G08G 1/166;
(Continued)

(56) References Cited

U.S. PATENT DOCUMENTS 10,311,833 B1 * 6/2019 Qiu ...................... G09G 5/003
10,468,062 B1 * 11/2019 Levinson ............... G06N 20/00
(Continued)

FOREIGN PATENT DOCUMENTS

CN 202512237 U 10/2012
CN 105160356 A 12/2015
(Continued)

*Primary Examiner* — Keith D Bloomquist
(74) *Attorney, Agent, or Firm* — Leydig, Voit & Mayer, Ltd.

(57) ABSTRACT

The present disclosure relates to the field of intelligent driving, and discloses an information fusion method. The method is applied to intelligent vehicles, and includes: obtaining a plurality of sensing information sets, where each sensing information set includes information about at least one target, and different sensing information sets come from sensing systems of different devices; and when at least two sensing information sets in the plurality of sensing information sets include information about a first target, fuse the information about the first target in the at least two sensing information sets to obtain fused information about the first target. In the method, information about a same target in a plurality of sources is fused to make the fused information about the target more accurate and effective.

16 Claims, 7 Drawing Sheets

(51) Int. Cl.
| | |
|---|---|
| *G01C 21/36* | (2006.01) |
| *G06V 10/74* | (2022.01) |
| *G06V 10/80* | (2022.01) |
| *G06V 10/94* | (2022.01) |
| *G06V 20/56* | (2022.01) |
| *G08G 1/01* | (2006.01) |
| *G08G 1/0967* | (2006.01) |

(52) U.S. Cl.
CPC .............. *G06V 10/25* (2022.01); *G06V 10/74* (2022.01); *G06V 10/80* (2022.01); *G06V 10/95* (2022.01); *G06V 20/56* (2022.01); *G08G 1/0967* (2013.01); *G06V 2201/07* (2022.01)

(58) Field of Classification Search
CPC .......... G08G 1/096708; G01C 21/3667; G01C 21/387; G06V 10/25; G06V 10/74; G06V 10/95; G06V 20/56; G06V 2201/07; G06V 10/80–811; G06F 18/251
See application file for complete search history.

(56) References Cited

U.S. PATENT DOCUMENTS

| | | | |
|---|---|---|---|
| 10,482,003 B1* | 11/2019 | Bondor | .............. G06F 11/3684 |
| 2005/0073433 A1 | 4/2005 | Gunderson et al. | |
| 2010/0228692 A1* | 9/2010 | Guralnik | ............... G06F 18/256 |
| | | | 706/54 |
| 2011/0190972 A1 | 8/2011 | Timmons et al. | |
| 2017/0123421 A1* | 5/2017 | Kentley | .................. G01C 21/26 |
| 2017/0132934 A1* | 5/2017 | Kentley | ............... G05D 1/0088 |
| 2018/0068206 A1* | 3/2018 | Pollach | .................. G06V 20/56 |
| 2018/0068496 A1 | 3/2018 | Nix | |
| 2018/0232947 A1 | 8/2018 | Nehmadi et al. | |
| 2019/0340787 A1* | 11/2019 | Ramirez Llanos | ...... B60D 1/62 |
| 2019/0371175 A1* | 12/2019 | Joos | ........................ G06F 16/29 |
| 2021/0097783 A1* | 4/2021 | Soltani Bozchalooi | ..................... |
| | | | G05D 1/0094 |

FOREIGN PATENT DOCUMENTS

| | | |
|---|---|---|
| CN | 108573271 A | 9/2018 |
| CN | 108764373 A | 11/2018 |
| CN | 108957413 A | 12/2018 |
| CN | 109635855 A | 4/2019 |
| CN | 109949570 A | 6/2019 |
| CN | 110203204 A | 9/2019 |
| CN | 110276972 A | 9/2019 |
| CN | 110304063 A | 10/2019 |
| CN | 110376583 A | 10/2019 |
| WO | 2019195363 A1 | 10/2019 |

\* cited by examiner

INFORMATION FUSION METHOD AND SYSTEM

CROSS-REFERENCE TO RELATED APPLICATIONS

This application is a continuation of International Application No. PCT/CN2020/101542, filed on Jul. 13, 2020, which claims priority to Chinese Patent Application No. 201911026822.6, filed on Oct. 26, 2019, and Chinese Patent Application No. 202010196398.6, filed on Mar. 19, 2020. All of the aforementioned patent applications are hereby incorporated by reference in their entireties.

TECHNICAL FIELD

This application relates to the field of intelligent driving (intelligent driving), and in particular, to an information fusion method and a system.

BACKGROUND

Intelligent driving has great potential in reducing traffic accidents, alleviating traffic congestion, and improving road utilization, and has become a competitive hot spot for many enterprises. Intelligent driving means that a vehicle can intelligently perform sensing, determining, reasoning, deciding, and memorizing, and intelligently control or drive itself like people. A vehicle with an intelligent driving capability is referred to as an intelligent vehicle. Compared with a common vehicle, the intelligent vehicle has an advanced apparatus such as a sensor (a radar, a camera, or the like), a controller, or an actuator, and therefore the vehicle has an environment sensing capability. The vehicle can automatically analyze a driving status of the vehicle and intelligently make a decision, so that people are replaced to operate the vehicle.

A key technology for intelligent driving of the intelligent vehicle is that the intelligent vehicle needs to be able to accurately obtain information about a target in a surrounding environment, so that the intelligent vehicle can determine a future traveling track, a traveling speed, and the like based on the information about the target. Usually, the intelligent vehicle can sense another target around the self-vehicle by using a plurality of sensing devices (for example, a laser radar, a millimeter wave radar, and a camera) installed on the intelligent vehicle, to obtain a sensing information set, for example, a surrounding pedestrian vehicle, a type of a vehicle or a facility, a position, and a movement status. The intelligent vehicle may also receive information transmitted by another device to the vehicle over a communications link. How to fuse multi-source information by the intelligent vehicle to obtain more accurate and effective target information is an urgent technical problem to be resolved.

SUMMARY

This application provides an information fusion method. In the method, information about a same target from a plurality of sources is fused, so that the obtained fused information about the target is more accurate and effective.

According to a first aspect, this application provides an information fusion method, where the method is applied to an intelligent vehicle and includes: obtaining a plurality of sensing information sets, where each sensing information set includes information about at least one target, and different sensing information sets come from sensing systems of different devices; and when at least two sensing information sets in the plurality of sensing information sets include information about the first target, fusing the information about the first target in the at least two sensing information sets, to obtain fused information about the first target.

In the foregoing method, the information about the first target in a plurality of sources is fused, so that the obtained fused information about the first target is more accurate and effective, and driving safety of the intelligent vehicle is further improved.

In an embodiment of the first aspect, the fusing the information about the first target in the at least two sensing information sets, to obtain fused information about the first target includes: obtaining confidence of the information about the first target in each sensing information set; and fusing the information about the first target in the at least two sensing information sets based on the confidence of the information about the first target in each sensing information set, to obtain the fused information about the first target.

The confidence of the first target in each sensing information set is considered during fusion, and information is fused based on the confidence, so that simple information superposition is avoided, and accuracy and validity of the obtained fused information about the first target are further improved.

In an embodiment of the first aspect, the confidence of the information about the first target in each sensing information set is confidence of the corresponding sensing information set, and the method further includes: calculating a matching degree between information about a target in each sensing information set at a previous moment and fused information about a target corresponding to a sensing information set at the previous moment: and determining confidence of each sensing information set at a current moment based on the matching degree.

The confidence of each sensing information set at the current moment is dynamically determined based on the matching degree of the information about the target in the sensing information set at the previous moment, so that the confidence is more accurate.

In an embodiment of the first aspect, the confidence of the information about the first target in each sensing information set is confidence of the corresponding sensing information set, and the confidence of each sensing information set is determined by an attribute of a device corresponding to each sensing information set.

Because the inherent attribute of the device affects the confidence of the sensing information set generated by the device, determining the confidence based on the attribute of the device can make the obtained confidence more conform to a real situation.

In an embodiment of the first aspect, devices generating the plurality of sensing information sets include: a vehicle communicating with the intelligent vehicle, a roadside device communicating with the intelligent vehicle, and the intelligent vehicle.

In an embodiment of the first aspect, before the fusing the information about the first target in the at least two sensing information sets, the method further includes: determining a region of interest (ROI) of the intelligent vehicle based on driving information about the intelligent vehicle; and filtering out, based on the ROI, information about a target whose position is not in the ROI in each sensing information set. The information about the target that is not within the ROI is filtered out, so that a computing resource consumption rate is reduced, a computing delay is reduced, and driving and decision-making sensitivity of the intelligent vehicle is further improved.

In an embodiment of the first aspect, the method further includes: searching for a tracking list when only one sensing information set in the plurality of sensing information sets includes the information about the first target: if no historical information about the first target is recorded in the tracking list, constructing a prediction model based on the information about the first target, to obtain prediction information about the first target at a next moment: setting confidence of the prediction model; and recording, into the tracking list, the information about the first target, the confidence, and the prediction information about the first target at the next moment.

In an embodiment of the first aspect, the method further includes: searching for a tracking list when only one sensing information set in the plurality of sensing information sets includes the information about the first target: if historical information about the first target is recorded in the tracking list, comparing the information about the first target with prediction information that is of the first target at the current moment and that is recorded in the tracking list, and obtaining updated confidence based on a comparison result and the confidence of the prediction model that is recorded in the tracking list: adjusting a parameter of the prediction model based on the comparison result, to obtain an adjusted prediction model: obtaining prediction information about the first target at a next moment based on the information about the first target and the adjusted prediction model; and recording, into the tracking list, the information about the first target, the updated confidence, and the prediction information about the first target at the next moment.

In an embodiment of the first aspect, the method further includes: obtaining a map and status information about the intelligent vehicle: constructing an environment model based on the fused information about the first target, the map, and the status information about the intelligent vehicle; and displaying the environment model.

In an embodiment of the first aspect, each sensing information set is an information set in a standardized format. The information set in the standardized format facilitates communication between other devices and the intelligent vehicle, so that a processing delay is reduced, and information security is improved.

In an embodiment of the first aspect, the obtaining a plurality of sensing information sets includes: receiving a sensing information set sent by a device communicating with the intelligent vehicle; and performing authentication on the sensing information set, and retaining the sensing information set if the sensing information set is authenticated as valid. Authentication can prevent an unauthorized device from sending information to interfere the sensing information sets, so that driving security of the intelligent vehicle is improved.

According to a second aspect, this application further provides an apparatus. The apparatus includes: an obtaining unit, configured to obtain a plurality of sensing information sets, where each sensing information set includes information about at least one target, and different sensing information sets come from sensing systems of different devices; and a processing unit, configured to: when at least two sensing information sets in the plurality of sensing information sets include information about a first target, fuse the information about the first target in the at least two sensing information sets, to obtain fused information about the first target.

In an embodiment of the second aspect, the processing unit is specifically configured to: obtain confidence of the information about the first target in each sensing information set; and fuse the information about the first target in the at least two sensing information sets based on the confidence of the information about the first target in each sensing information set, to obtain the fused information about the first target.

In an embodiment of the second aspect, the confidence of the information about the first target in each sensing information set is confidence of the corresponding sensing information set, and the processing unit is further configured to: calculate a matching degree between information about a target in each sensing information set at a previous moment and fused information about a target corresponding to a sensing information set at the previous moment, and determine confidence of each sensing information set at a current moment based on the matching degree.

In an embodiment of the second aspect, the confidence of the information about the first target in each sensing information set is confidence of the corresponding sensing information set, and the confidence of each sensing information set is determined by an attribute of a device corresponding to each sensing information set.

In an embodiment of the second aspect, devices generating the plurality of sensing information sets include: a vehicle communicating with the intelligent vehicle, a roadside device communicating with the intelligent vehicle, and the intelligent vehicle.

In an embodiment of the second aspect, the processing unit is further configured to: determine a region of interest ROI of the intelligent vehicle based on the driving information about the intelligent vehicle; and filter out, based on the ROI, information about a target whose position is not in the ROI in each sensing information set.

In an embodiment of the second aspect, the processing unit is further configured to: when only one sensing information set in the plurality of sensing information sets includes the information about the first target, search for a tracking list: if no historical information about the first target is recorded in the tracking list, construct a prediction model based on the information about the first target, to obtain prediction information about the first target at a next moment: set confidence of the prediction model; and record, into the tracking list, the information about the first target, the confidence, and the prediction information about the first target at the next moment.

In an embodiment of the second aspect, the processing unit is further configured to: search for a tracking list when only one sensing information set in the plurality of sensing information sets includes the information about the first target: if historical information about the first target is recorded in the tracking list, compare the information about the first target with prediction information that is of the first target at the current moment and that is recorded in the tracking list, and obtain updated confidence based on a comparison result and the confidence of the prediction model that is recorded in the tracking list: adjust a parameter of the prediction model based on the comparison result, to obtain an adjusted prediction model; obtain prediction information about the first target at a next moment based on the information about the first target and the adjusted prediction model; and record, into the tracking list, the information about the first target, the updated confidence, and the prediction information about the first target at the next moment.

In an embodiment of the second aspect, the processing unit is further configured to: obtain a map and status information about the intelligent vehicle: construct an environment model based on the fused information about the first target, the map, and the status information about the intelligent vehicle; and display the environment model.

In an embodiment of the second aspect, each sensing information set is an information set in a standardized format.

In an embodiment of the second aspect, the processing unit is further configured to: receive a sensing information set sent by a device communicating with the intelligent vehicle; and perform authentication on the sensing information set, and retain the sensing information set if the sensing information set is authenticated as valid. Authentication can prevent an unauthorized device from sending information to interfere the sensing information sets, so that driving security of the intelligent vehicle is improved.

According to a third aspect, this application further provides an in-vehicle apparatus, the in-vehicle apparatus is disposed in a vehicle, and the in-vehicle apparatus is configured to perform the method provided in any one of the first aspect or the embodiments of the first aspect.

According to a fourth aspect, this application further provides a device, including a processor and a memory, where the memory stores program code, and the processor executes the program code, so that the device is enabled to perform the method according to any one of the first aspect or the embodiments of the first aspect.

According to a fifth aspect, this application further provides a vehicle. The vehicle includes a storage unit and a processing unit, the storage unit of the vehicle is configured to store a group of a computer instruction and a data set, the processing unit executes the computer instruction stored in the storage unit, and the processing unit reads the data set in the storage unit, so that the vehicle is enabled to perform the method according to any one of the first aspect or the embodiments of the first aspect.

According to a sixth aspect, this application provides a computer-readable storage medium. The computer-readable storage medium stores computer program code, and when the computer program code is executed by a computing device, the computing device performs the method according to any one of the first aspect or the embodiments of the first aspect. The storage medium includes but is not limited to a volatile memory, for example, a random access memory or a non-volatile memory, for example, a flash memory, a hard disk drive (HDD), or a solid-state drive (SSD).

According to a seventh aspect, this application provides a computer program product, where the computer program product includes computer program code, and when the computer program code is executed by a computing device, the computing device performs the method according to the first aspect or any possible implementation of the first aspect. The computer program product may be a software installation package. When the method provided in any one of the first aspect or the embodiments of the first aspect is used, the computer program product may be downloaded to and executed on the computing device.

DESCRIPTION OF EMBODIMENTS

Figure 1:
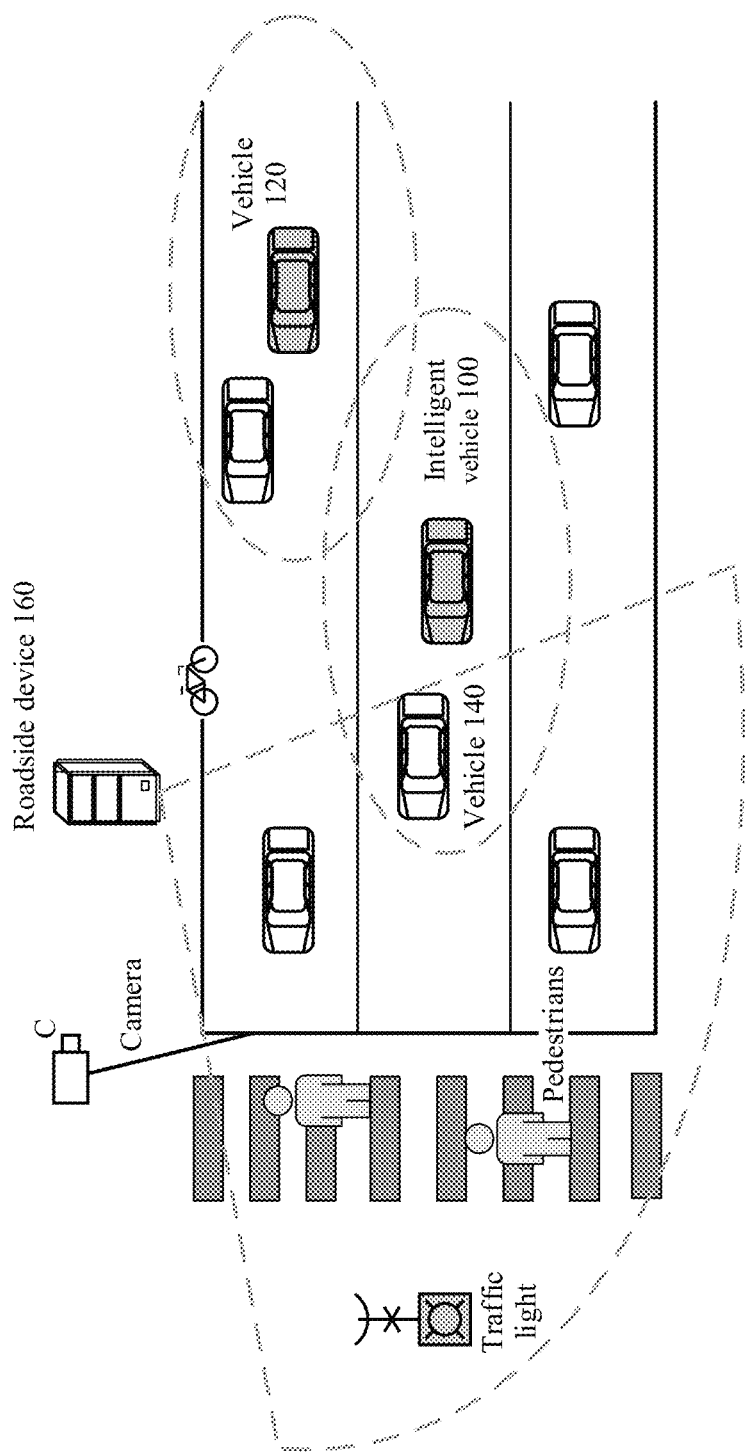
FIG. 1 is a schematic diagram of an application scenario according to an embodiment of this application.

To describe the technical solutions in the embodiments of this application more clearly, the following explains some terms.

Sensing: Sensing is a process in which a sensor or another sensing device detects a surrounding environment of the sensor or the another sensing device to obtain information about a target in the surrounding environment.

Sensor system: The sensor system is a system including at least one sensor or at least one type of sensor or sensing device. Information about a target in a surrounding environment of the sensor system can be obtained by using the sensor system.

Sensing information set: In this application, the sensing information set is an information set including information about a target that is obtained by a sensor system, or an information set obtained after information about a target that is obtained by a sensor system is integrated and processed.

Target: The target in the embodiments of this application is an object running on a traffic road or a traffic sign or a traffic facility around a traffic road. The object running on the traffic road includes a pedestrian, a motor vehicle (such as an intelligent vehicle or a common vehicle), and a non-motor vehicle. The traffic sign or the traffic facility around the traffic road includes a building area sign, a traffic police gesture, a speed limit sign, a traffic signal light, and a snapshot camera. The information about the target includes one or more of a type, a position, a speed, an orientation (also referred to as a posture), a time, and a status of the target.

Surrounding environment: Because each sensor in a sensor system in each vehicle or roadside device has a different sensing region, in this application, a surrounding environment of each vehicle or roadside device is a geographic area corresponding to a union of sensing regions of a plurality of sensors in the sensor system of the vehicle or the roadside device. The surrounding environment of each vehicle or roadside device may also be referred to as a sensing region of the vehicle or the roadside device.

Information fusion: Information fusion is a process in which a plurality of groups of information from different sources are processed in a specific manner (for example, by using a fusion algorithm), to obtain one group of information. Fusion may include: obtaining one new group of information based on a plurality of groups of source information, or may include: determining one group of source information from a plurality of groups of source information, or may include one new group of information including content of a plurality of groups of source information obtained through splicing based on the plurality of groups of source information.

Intelligent vehicle: The intelligent vehicle is a vehicle that has functions such as environment sensing, planning and decision-making, assisted driving, or autonomous driving. The intelligent vehicle can also communicate with another device.

Roadside device (road side unit, RSU): The roadside device is a device that is disposed near a traffic road and that has a sensing capability and a computing capability. The roadside device includes a sensor system, and may obtain a sensing information set of a surrounding environment by using the sensor system. The roadside device may further communicate with another device.

Vehicle-to-everything (V2X) technology: The V2X technology is a technology for establishing a communication connection between a vehicle and everything that may be related to the vehicle in a surrounding environment of the vehicle.

The V2X technology includes a vehicle-to-vehicle (V2V) technology for establishing a communication connection between a vehicle and a surrounding vehicle, a vehicle-to-infrastructure (V2I) technology for establishing a communication connection between a vehicle and a surrounding traffic facility, for example, a traffic signal light, a bus stop, a utility pole, a building, an overpass, a tunnel, or a barricade, a vehicle-to-pedestrian (V2P) technology for establishing a communication connection between a vehicle and an intelligent device such as a smartphone of a pedestrian, and a vehicle-to-network (V2N) technology for establishing a communication connection between a vehicle and a network. There are a plurality of implementations of the V2X technology: 1. Dedicated short-range communications (DSRC) technology. 2. Long term evolution (LTE) V2X technology, namely, a mobile cellular network-based V2X communications technology.

Intelligent driving is a major trend in smart city and smart transportation. Through intelligent driving technologies, the intelligent vehicle can perform autonomous sensing, analysis, and determining, and implement autonomous driving or intelligent assisted driving. In an actual scenario, an intelligent vehicle, a common vehicle, and a pedestrian may jointly travel on a traffic road. At a moment, for a traveling track and a speed of an intelligent vehicle, both information about another vehicle or pedestrian in a surrounding environment at the current moment and information about a traffic facility or a traffic sign, for example, a traffic signal light status, a speed limit sign, or a traffic limit sign of the traffic road at the current moment need to be considered.

An on-board sensor of the intelligent vehicle can sense information about a target in the surrounding environment of the vehicle, and use the obtained information to make a decision on the traveling track and speed. However, the information about the target in the surrounding environment obtained only by the sensor of the intelligent vehicle is often incomplete and inaccurate. Therefore, the intelligent vehicle may further receive a sensing information set obtained by a sensor system of the another device on the traffic road, and fuse the obtained sensing information set of the another device with a sensing information set obtained by the intelligent vehicle, to obtain a fused sensing information set.

As shown in FIG. 1, in an application scenario, when an intelligent vehicle 100 runs on a traffic road, targets around the intelligent vehicle 100 include a vehicle 120 (for example, an intelligent vehicle) that has a sensing capability and a communication capability. Such a vehicle may send information about the vehicle and a sensing information set that is obtained through a sensor system of the vehicle to the intelligent vehicle. The surrounding targets also include a vehicle 140 that has only a communication capability but does not have a sensing capability, and such a vehicle may send information about the vehicle to the intelligent vehicle (for example, information such as a position, direction, and speed of the vehicle at the current moment). The surrounding targets further include a roadside device 160. The roadside device 160 may send, to the intelligent vehicle 100, information about the roadside device 160 and a sensing information set including information about targets sensed by the roadside device 160. The surrounding targets further include a vehicle that has neither a communication capability nor a sensing capability, a pedestrian, an obstacle, or the like. Information about such targets can be obtained through sensing only by a roadside device 160 or a vehicle that has a sensing capability around the targets. As shown in FIG. 1, sensing ranges of the intelligent vehicle 100, the vehicle 120, and the roadside device 160 are limited. Therefore, the intelligent vehicle 100 may receive a sensing information set and/or driving information sent by the another surrounding vehicle (the vehicle 120 or the vehicle 140) through the communications link, or may receive the sensing information set sent by the roadside device 160 through the communications link. In this way, information about all targets in a large range may be obtained. In an embodiment, the V2X technology may be used in the method in which the surrounding vehicle or the roadside device sends the sensing information set to the intelligent vehicle.

After the intelligent vehicle obtains the multi-source sensing information set, the multi-source sensing information set usually includes sensing results obtained by sensing a same target by a plurality of different sensing devices in the sensor system. Because the different devices have different sensing ranges, the obtained different sensing information sets may further include information about different targets. In addition, because the different devices have different sensing capabilities for different targets or in different ranges, accuracy of information about each target in the obtained sensing information set may be different. Therefore, after receiving the multi-source sensing information set, the intelligent vehicle needs to perform information fusion processing, so that fused information can be effectively used for subsequent planning or decision-making. When information fusion is performed in related technologies, only a plurality of groups of original information are simply superimposed, and information obtained after fusion is still not accurate. The fused information obtained in this manner is used for path planning and control, and a robust driving requirement of the intelligent vehicle cannot be met.

In view of the foregoing problem, this application provides an information fusion method. Before the specific method in this application is described, a system architecture to which the embodiments of this application are applicable is first described.

Figure 2:
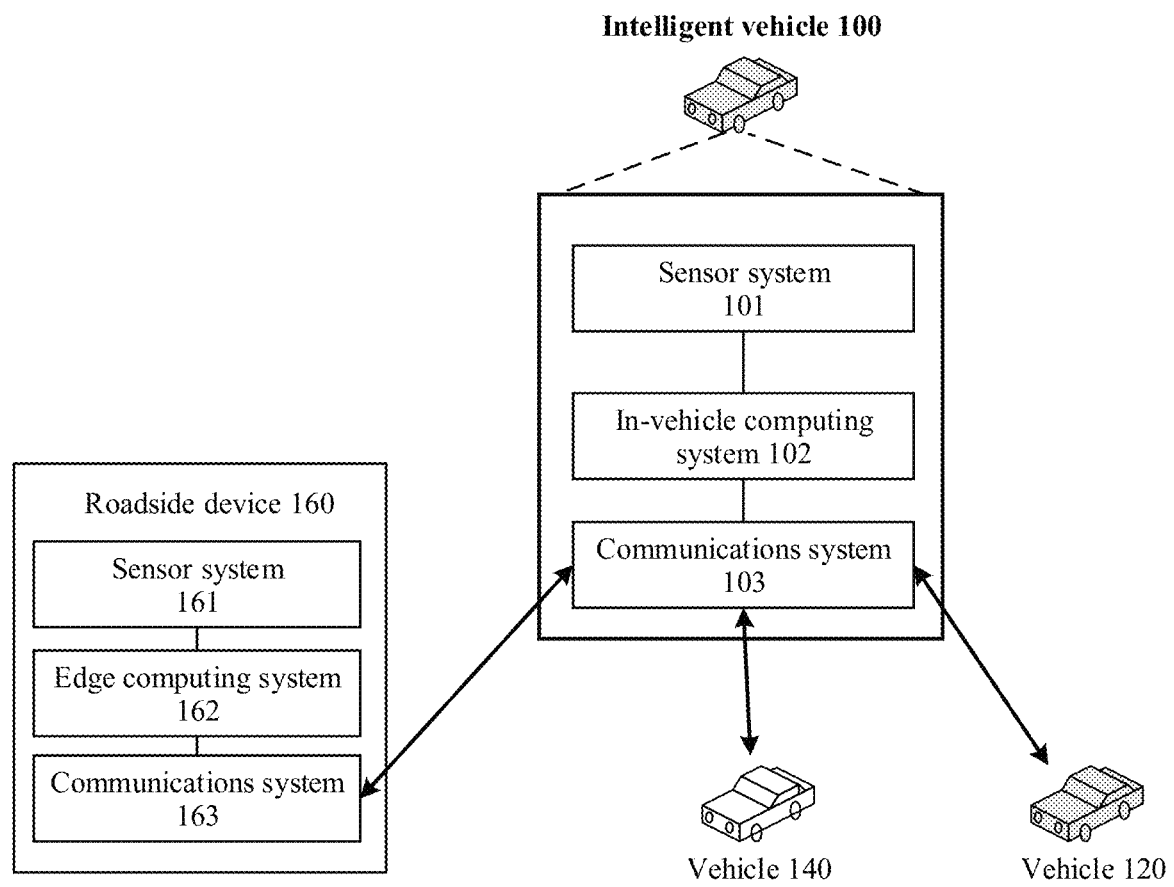
FIG. 2 is a schematic diagram of a system architecture according to an embodiment of this application.

As shown in FIG. 2, the intelligent vehicle 100 includes a sensor system 101, an in-vehicle computing system 102, and a communications system 103.

The sensor system 101 is configured to detect and sense targets in a surrounding environment of the intelligent vehicle, and obtain information about the targets in the surrounding environment. The sensor system 101 may include a plurality of types of hardware sensors or software sensors, or a combination of a hardware sensor and a software sensor. For example, the sensor system 101 may include any one or more types of a camera, a laser radar, a millimeter wave radar, an ultrasonic radar, and an infrared sensor. Each type of sensor in the sensor system 101 may include one or more.

The in-vehicle computing system 102 is configured to: receive a sensing information set sent by the sensor system 101 or obtain a sensing information set sent by the communications system 103, and parse and fuse the sensing information set. The in-vehicle computing system 102 is further configured to obtain information sent by another module or system in the intelligent vehicle 100, for example, obtain information such as a self-vehicle position or a high-definition map. The in-vehicle computing system 102 is further configured to plan a vehicle traveling track and generate a driving decision instruction for the intelligent vehicle 100 based on fused information, so that the intelligent vehicle 100 can automatically travel according to the decision instruction.

The communications system 103 is configured to perform information communication with another device that has a communication capability around the intelligent vehicle 100, for example, communicate with a vehicle on a traffic road or a peripheral roadside device. Optionally, the communications system 103 may further perform information communication with a data center or the like. The communications system 103 may communicate with the another device or system by using a plurality of communications technologies, for example, a fourth generation mobile communications technology (4G) and a fifth generation mobile communications technology (5G). More specifically, in some embodiments, a V2X unit is installed in the communications system 103, and a V2X technology may be used to implement faster and real-time communication with another vehicle or the roadside device on the traffic road.

As shown in FIG. 2, the vehicle 120 that can communicate with the intelligent vehicle 100 is also a vehicle that has a sensing capability and a communication capability, and a structure included in the vehicle 120 may be the same as a structure included in the intelligent vehicle 100. Details are not described herein again. The vehicle 140 that can communicate with the intelligent vehicle 100 is a vehicle that has a communication capability but does not have a sensing capability, and the vehicle 140 includes a communications system and an in-vehicle computing system. The roadside device 160 that communicates with the intelligent vehicle 100 includes a sensor system 161, an edge computing system 162, and a communications system 163.

The sensor system 161 is configured to sense targets around the roadside device 160, to obtain information about the plurality of targets. A hardware sensor or a software sensor that may be specifically included in the sensor system 161 may be the same as that in the sensor system 101. Details are not described herein again.

The edge computing system 162 is configured to: receive the information about the plurality of targets sent by the sensor system 161, process and/or code the obtained information about the plurality of targets, and send the obtained sensing information set to the intelligent vehicle 100 or another vehicle. The processing may include fusing information that is about a same target sensed by a plurality of sensors in the sensor system, to obtain fused information about a plurality of targets in a sensing region of the sensor system, and the coding may include coding the obtained fused information about the plurality of targets in a specific orchestration order, to form a set of information in a specific order.

Optionally, in another implementation, the sensor system 161 in the roadside device 160 may process and code the information about the targets obtained by the sensor, and the obtained sensing information set may be sent by the communications system 163 to another device.

Functions of the communications system 163 are the same as those of the communications system 103. Details are not described herein again.

It should be understood that the intelligent vehicle 100, the vehicle 120, the vehicle 140, and the roadside device 160 further include many other systems and structures. For example, the intelligent vehicle 100 further includes a power system. This is not limited in this application.

The in-vehicle computing system 102 is an important system that supports intelligent driving of the intelligent vehicle 100. The in-vehicle computing system 102 may perform multi-source information fusion, travel track prediction, travel planning, control, and the like. The in-vehicle computing system 102 may be specifically one in-vehicle computing device or a set of in-vehicle computing devices installed in the intelligent vehicle 100. Alternatively, the in-vehicle computing system 102 may be a software system running on one or more in-vehicle computing devices in the intelligent vehicle 100. Alternatively, the in-vehicle computing system 102 may be a system combining software and hardware. The following describes a structure of the in-vehicle computing system 102 with reference to FIG. 3. The in-vehicle computing system 102 may include a map management and vehicle positioning module 1021, a vehicle status monitoring module 1022, an information fusion module 1023, and a planning control module 1024. Each of the foregoing modules may communicate with another system or device other than the in-vehicle computing system 102. Alternatively, the foregoing modules may communicate with each other. In some embodiments, a communication relationship between the modules may be shown by connection lines in FIG. 3.

The map management and vehicle positioning module 1021 is configured to manage a stored map (for example, a high-precision map), for example, update the map. The map management and vehicle positioning module 1021 is further configured to obtain real-time position information about the self-vehicle, and determine a position of the self-vehicle on the map at a current moment. Optionally, the map management and vehicle positioning module 1021 may further obtain information about a map in a specific area around the vehicle based on a current position of the vehicle, and send the information about the map to the information fusion module 1023. The sent information about the map may include road signs in a specific area around the vehicle, such as a road route, a lane line, and a stop line.

The vehicle status monitoring module 1022 is configured to monitor a traveling speed of the self-vehicle, a heading angle, a status of a body sensor, and the like, to obtain status information about the self-vehicle. The vehicle status monitoring module 1022 sends the status information about the vehicle to the information fusion module 1023.

The information fusion module 1023 is configured to perform the information fusion method provided in this application. Specific actions performed by the information fusion module 1023 are described in detail below.

The planning control module 1024 is configured to perform route planning and driving control of automatic driving or auxiliary automatic driving based on the fused information sent by the information fusion module 1023 and information sent by another system or module.

It should be noted that all the foregoing modules may be implemented through software and/or hardware. In addition, any one or more of the modules may be disposed independently, or may be integrated together. This is not specifically limited in this embodiment of this application.

This application provides an information fusion method. The method is applied to an intelligent vehicle. In some embodiments, the method may be performed by the foregoing intelligent vehicle 100. Alternatively, in some other embodiments, the method may be more specifically performed by the in-vehicle computing system 102 in the intelligent vehicle 100. Alternatively, in some other embodiments, the method may be specifically performed by the foregoing information fusion module 1023. In the method, a plurality of types of received information are fused to obtain fused information, so that the fused information can be more effectively used for planning and controlling the intelligent vehicle, for example, adjusting a traveling track and adjusting a traveling speed based on the fused information.

Figure 4:
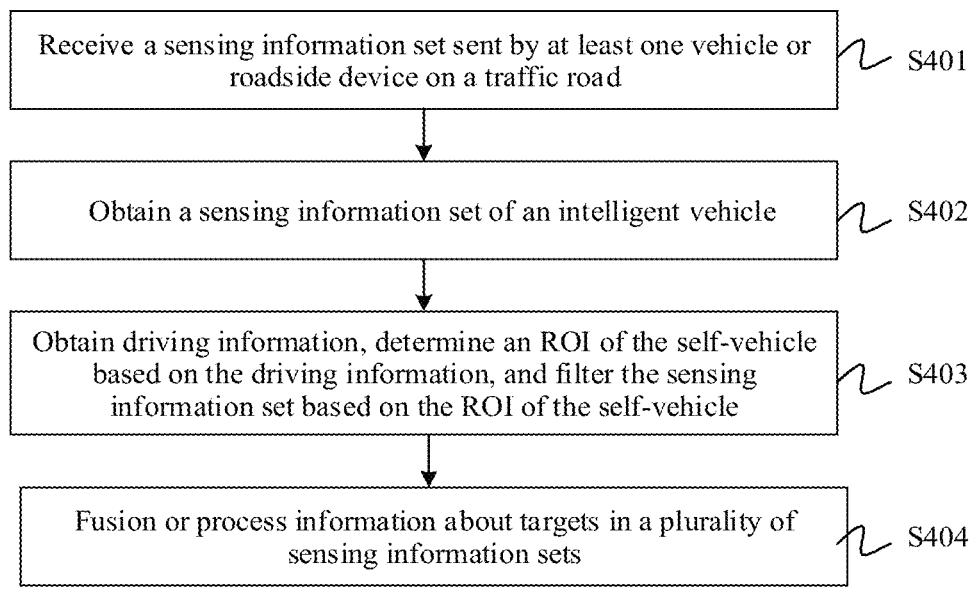
FIG. 4 is a flowchart of an information fusion method according to an embodiment of this application.

An embodiment of an information fusion method is described in detail below with reference to FIG. 4.

S401: Receive a sensing information set sent by at least one vehicle or roadside device on a traffic road.

Specifically, at a moment, when running on the traffic road, the intelligent vehicle may receive the sensing information set sent by a moving vehicle on the traffic road and/or the sensing information set sent by the roadside device on the traffic road (the vehicle or roadside device on the traffic road may broadcast, by using a V2X technology, respective obtained sensing information sets). Each sensing information set is an information set obtained by a sensor system in a vehicle or a roadside device, or an information set obtained by a vehicle or a roadside device after the vehicle or the roadside device processes a sensing result that is of targets in a surrounding environment of the vehicle or the roadside device and that is obtained by the sensor system. The sensing information set sent by each vehicle or the roadside device includes information about targets in a sensing region of the vehicle or the roadside device (that is, the surrounding environment of the vehicle or the roadside device). Therefore, targets included in content of sensing information sets sent by different devices or systems may be the same, partially the same, or different. For example, for a vehicle A, targets in a sensing region of the vehicle A include a, b, and c, and for a roadside device B, targets in a sensing region of the roadside device B include a, d, and h. In this case, a sensing information set sent by the vehicle A includes information about the targets a, b, and c, and a sensing information set sent by the roadside device B includes information about the targets a, d, and h. Therefore, the targets included in the sensing information set sent by the vehicle A are partially the same as the targets included in the sensing information set sent by the roadside device B. Optionally, the sensing information set sent by each vehicle or the roadside device may further include information about the vehicle or the roadside device.

The sensing information set includes information about a plurality of targets. Specifically, the information may be types of the plurality of targets and related information about each type of target. Related information about different types of targets may be the same or may be different. The following provides examples of related information about several main types of targets. It should be understood that the following description is merely used as an example, and the sensing information set may further include more types of targets and related information.

1. If a type of the target is a vehicle, related information about the vehicle may include a coordinate system of position information about the vehicle in a global coordinate system (the global coordinate system, for example: Universal Transverse Mercator (UTM)), a world geodetic system-1984 coordinate system (WGS-84)), speed information about the vehicle, direction information about the vehicle, and time stamp information. Optionally, feature information such as a vehicle type, a color, and a license plate of the vehicle may further be included.

2. When the type of the target is a pedestrian, related information about the pedestrian may include position information about the pedestrian in the global coordinate system, a direction of the pedestrian, and speed information about the pedestrian. Optionally, feature information such as an age and clothing of the pedestrian may further be included.

3. When the type of the targets is a traffic signal light, a traffic sign, a roadblock, a traffic police gesture, an unclassified obstacle, or the like, related information about these targets mainly includes position information about these targets in the global coordinate system and content information about these targets. For example, content information about the traffic signal light is a status of the traffic signal light at a current moment, content information about the traffic sign is a traffic meaning represented by the traffic sign, and content information about the roadblock is that the road is impassable or there is a traffic jam on the road.

Optionally, after receiving the sensing information set in S401, the intelligent vehicle 100 may further authenticate the received sensing information set, and determine validity of the received sensing information set. When it is determined that the received sensing information set is invalid information, the information is discarded, or a message may be further sent to a security check system or an alarm system, so that the intelligent vehicle 100 performs security prevention. When it is determined that the received sensing information set is valid information, subsequent steps continue to be performed.

A specific authentication manner is not limited in this embodiment of this application. A common authentication manner in the industry may be used to perform authentication on the sensing information set, for example, a method for performing encryption and decryption by using a public key and a private key to perform authentication. Specifically, the intelligent vehicle 100 may generate a pair of a public key and a private key, and release the public key to a valid peripheral vehicle or a roadside device. When sending the sensing information set to the intelligent vehicle 100, the peripheral vehicle or the roadside device encrypts the original sensing information set by using the public key released by the intelligent vehicle 100, sends the encrypted sensing information set to the intelligent vehicle 100. The intelligent vehicle 100 performs decryption authentication by using the private key, and when successfully decrypting the obtained sensing information set by using the private key, may consider that the received sensing information set is authenticated as valid information.

Authentication on the received sensing information set may greatly reduce a security risk of the intelligent vehicle, for example, a malicious sender may be prevented from sending an error sensing information set to the intelligent vehicle, to avoid a traffic accident caused by incorrect planning or control by the intelligent vehicle based on the received error information. In addition, authentication on the received sensing information set can also avoid a problem that the sensing information set is unknown to the intelligent vehicle after being maliciously tampered with in a transmission process. In this way, security of the intelligent vehicle greatly improved.

Optionally, the information received in S401 may alternatively be an information set coded in a standardized format. In other words, after performing fusion processing on the information that is of the plurality of targets and that is obtained by the sensor system, the vehicle or the roadside device codes fused information about the plurality of targets in the standardized format, to form a sensing information set. The standardized format coding manner may be uniformly used by all vehicles and roadside devices on the traffic road. Therefore, communication between vehicles on the traffic road or between a vehicle and a roadside device may be performed by using a unified information structure and a protocol. In this way, communication efficiency and accuracy are improved. Further, information transmission is performed after coding in the unified standardized format, which is also an information encryption manner, so that malicious tampering in a communication process can be avoided, and another malicious device can be prevented from sending a false sensing information set. In the standardized format coding manner, information about types of the sensed targets may be arranged in a specific order, or information about one or more types of the targets may be represented in a specific data format (for example, an existing or customized coding policy in the industry is used).

For example, for a vehicle on the traffic road, information about N targets obtained by the vehicle by using the sensor system is processed in the standardized format coding manner, to obtain a sensing information set, where N is a positive integer greater than or equal to 1. In an embodiment, "Car" is used to represent a vehicle, "Static_object" is used to represent a static object, and "Pedestrian" is used to represent a pedestrian. The information about the N targets included in the sensing information set may be shown in the following table.

information about the target. Therefore, the in-vehicle computing system fuses information about the plurality of targets, to obtain the fused information about the target. For example, there is a target X in a sensing region of the intelligent vehicle, a camera of the intelligent vehicle may photograph the target X. and a radar sensor of the intelligent vehicle may also sense the target X. Position information, orientation information, time stamp information, type information and characteristic information about the target X may be obtained from a video image of the target X that is photographed by the camera. Position information, speed information, orientation information, time stamp information about the target X may be obtained from a signal sensed by the radar sensor. The in-vehicle computing system of the intelligent vehicle may fuse the information about the target X obtained by the camera and the information about the target X sensed by the radar sensor. A specific fusion manner includes: The position information, orientation information, time stamp information obtained in the two sensing devices are fused by using a fusion algorithm (for example, a Kalman weighting method, or a covariance weighting method), to obtain fused position information, orientation information, and timestamp information. The three pieces of information: the speed information, the type information, the characteristic information obtained only from the signal sensed by the radar sensor or the video image captured by the camera are directly as a part of the fused information about the target.

The fused information about the plurality of targets is formatted to form the sensing information set of the self-vehicle. The sensing information set of the self-vehicle includes information about targets in the sensing region of

TABLE 1

| Type | Detailed_type | Location | Description | Orientation | Speed (km/h) | Color | ... |
|---|---|---|---|---|---|---|---|
| Car | VXLAN_car | [11.11, 22.22] | | (q, r, t) | 65 | Red | ... |
| Static_object | Road_block | [33.33, 44.44] | Obstructing traffic | | | | ... |
| ... | ... | ... | ... | ... | ... | ... | ... |

It should be understood that Table 1 is merely an example of a coded sensing information set, and does not impose any limitation. According to an actual application, the sensing information set may include more detailed content of each type of target, and the sensing information set may also be coded in another standardized format.

When the sensing information set coded in the standardized format is received, the intelligent vehicle 100 can code targets in the coded sensing information set. In other words, the intelligent vehicle 100 may read information about a required target in the sensing information set coded in the standardized format.

S402: Obtain a sensing information set of the self-vehicle.

At a moment, when the intelligent vehicle runs on the traffic road, a sensor system of the intelligent vehicle obtains a sensing result of targets in a surrounding environment by using a plurality of sensors. An in-vehicle computing system of the self-vehicle receives information about a plurality of targets sent by the sensor system, and processes the information about the plurality of targets, to obtain the sensing information set of the self-vehicle.

Different sensing devices in the sensor system of the intelligent vehicle may sense a same target on the traffic road, and each sensor may separately obtain some or all the self-vehicle. It should be understood that the sensing information set of the self-vehicle that is obtained by the intelligent vehicle may have a same format as the sensing information set that is obtained by using a communications link and that is sent by another vehicle or the roadside device. For example, the two sensing information sets are formed after coding in the same standardized format.

S403: Obtain driving information about the intelligent vehicle, determine a region of interest (region of interest, ROI) of the intelligent vehicle based on the driving information, and filter the sensing information set based on the ROI.

A system or module in the intelligent vehicle may obtain the driving information about the self-vehicle, where the driving information is information such as a position, a status, and performance of the self-vehicle at the current moment, or information that is stored in the self-vehicle and that can be used to perform intelligent driving. For example, a vehicle status monitoring module may obtain status information about the self-vehicle, such as a traveling speed, a heading angle, and a status of a body sensor. A map management and vehicle positioning module may obtain position information about the vehicle and a high-definition map stored in the vehicle.

It should be understood that, in this embodiment of this application, the self-vehicle indicates the intelligent vehicle that performs the information fusion method provided in the embodiments of this application.

The ROI of the self-vehicle may be determined based on the driving information, and the ROI of the self-vehicle is a geographical range which is strongly correlated with the driving of the self-vehicle at the current moment. Information such as a position, a status, and a traveling track of a target in the ROI of the self-vehicle may affect a driving decision of the self-vehicle, for example, a traveling direction and a traveling speed at a next moment are determined. Therefore, the intelligent vehicle needs to obtain information about a target in a range of the ROI at the current moment. The ROI of the self-vehicle may be dynamically adjusted at each moment, and the ROI of the self-vehicle at one moment depends on any one or more types of information: the position of the self-vehicle, track planning of the self-vehicle at a previous moment or a previous time period, and navigation path information about the self-vehicle (for example, lane change, left turn, right turn, on/off ramp. U-turn, crossing intersection). There may be a plurality of methods for determining the ROI of the self-vehicle based on the driving information. A specific implementation is not limited in this application. A manner of determining the ROI of the self-vehicle based on the driving information may alternatively vary based on different traffic roads on which the self-vehicle is located. The following two specific implementations are used as an example:

1. When the intelligent vehicle runs on a highway section, a rectangular range around the intelligent vehicle may be determined as the ROI of the intelligent vehicle based on a traveling speed and a position of the intelligent vehicle.

For example, speed information V of the self-vehicle is obtained, a maximum braking distance M of the self-vehicle is calculated based on the speed information, and two front and rear parallel lines that have the maximum braking distance with the self-vehicle are determined on a map as a front boundary and a rear boundary of the ROI of the self-vehicle, where the self-vehicle is used as a center. A left boundary line of the leftmost lane of the highway is used as a left boundary of the ROI of the self-vehicle, and a right boundary line of the rightmost lane of the highway is used as a right boundary of the ROI of the self-vehicle. Therefore, a range of the ROI of the self-vehicle at the current moment and a current position on the map is determined based on the front, rear, left, and right boundary lines of the ROI of the self-vehicle.

For another example, in another implementation, it is determined that a vehicle speed at which the intelligent vehicle travels on the highway at the current moment is V, and a current position of the intelligent vehicle in a lane S-L coordinate system is $[S_0, L_0]$. In the S-L coordinate system, a centerline of a lane in which the intelligent vehicle is located is an S axis, and a cross-section of the lane is an L axis. m indicates a lane width, a planned trajectory of the intelligent vehicle at each moment (or each time period) is t (that is, a driving track in next t seconds is planned each time), $L_s$ is a centerline of the lane where the vehicle is located, $L_{-1}$ is a centerline of a left lane of the highway, and $L_1$ is a centerline of a right lane. In this case, it may be determined based on the foregoing information that a horizontal line of an ROI rectangular area of the intelligent vehicle is $[L_{-1}-m/2, L_1+m/2]$, and a vertical line of the ROI rectangular area of the intelligent vehicle is $[S_0-V \times t, S_0+2V \times t]$. In this way, the ROI rectangular region of the intelligent vehicle at the current moment is obtained, and the obtained horizontal line and vertical line of the ROI rectangular region in the S-L coordinate system may be converted into positions of the ROI rectangular region in the global coordinate system of the map based on a requirement.

2. When it is determined, based on the position information about the self-vehicle and the map, that the self-vehicle runs at the crossing intersection at the current moment, it is determined, based on the position information about the self-vehicle, that a circular area on the map that is centered on the self-vehicle and whose radius is 100 meters is the ROI of the self-vehicle. Alternatively, it is determined, based on the position information about the self-vehicle, that areas that include all sidewalks of the intersection on the map are the ROI of the self-vehicle.

Optionally, in another implementation, when the intelligent vehicle runs at a crossing intersection, the ROI of the intelligent vehicle at the current moment may alternatively be determined as a rectangular area. It is assumed that a vehicle speed at which the intelligent vehicle travels on the highway at the current moment is V, and a current position of the intelligent vehicle in a lane S-L coordinate system is $[S_0, L_0]$. In the S-L coordinate system, a centerline of a lane in which the intelligent vehicle is located is an S axis, and a cross-section of the lane is an L axis. m indicates a lane width, a planned trajectory of the intelligent vehicle at each moment (or each time period) is t (that is, a driving track in next t seconds is planned each time), $L_s$ is a centerline of the lane where the vehicle is located, $L_{-1}$ is a centerline of a left lane of the highway, and $L_{-1}$ is a centerline of a right lane. In this case, it may be determined based on the foregoing information that a horizontal line of the ROI rectangular area of the intelligent vehicle is $[L_0-2 \times V \times t, L_0+2 \times V \times t]$, and a vertical line of the ROI rectangular area of the intelligent vehicle is $[S_0-V \times t, S_0+2V \times t]$. In this way, the ROI rectangular region of the intelligent vehicle at the current moment is obtained, and the obtained horizontal line and vertical line of the ROI rectangular region in the S-L coordinate system may be converted into positions of the ROI rectangular region in the global coordinate system of the map based on a requirement. The obtained ROI region may be mapped to the map.

After the ROI of the intelligent vehicle at the current moment is obtained, information about a target that is in the sensing information set obtained in the foregoing step S401 or S402 and that is not in the ROI of the intelligent vehicle may be filtered out based on the ROI of the self-vehicle. Specifically, targets in each sensing information set are mapped, based on position information, to the map in which the ROI area is located, and a set of information about the targets in the ROI area is determined as the sensing information set used in subsequent steps in this embodiment of this application.

It should be noted that in some other embodiments of the information fusion method provided in this application, step S403 may not be performed.

It should be understood that a sequence of performing steps S401, S402, and S403 is not limited in this application. The three steps may be performed in any sequence, or any two or three steps may be performed simultaneously.

S404: Fuse information about the targets in the plurality of sensing information sets.

According to the foregoing steps S401 and S402, the intelligent vehicle may obtain the sensing information sets sent by one or more vehicles in the surrounding environment and the sensing information set obtained by sensing from the sensor system of the self-vehicle. In these sensing information sets, there may be a case in which the plurality of sensing information sets all include information about a same target, or there may be a case in which information about some targets is in only one sensing information set. Therefore, the information about the target in the plurality of sensing information sets needs to be fused or processed in different manners, to obtain one fused sensing information set.

Optionally, in some other embodiments, information about the targets in the filtered sensing information set obtained after S403 is performed may be fused. Information about a target in the ROI of the intelligent vehicle has a great impact on decision-making and track planning of the intelligent vehicle at the current moment, and information about a target outside the ROI has a negligible impact on the intelligent vehicle. Therefore, sensing information sets are filtered. Information about targets in the filtered sensing information sets is fused, so that computing resources and time are saved, and sensitivity of the intelligent vehicle is improved.

In a process of fusing the sensing information sets, the self-vehicle can fuse or process information about different targets in different ways based on different situations. Specifically, when the plurality of sensing information sets include information about a same target, the intelligent vehicle may determine, based on the sensing information set in which the target is located, confidence of the information about the target in each sensing information set, and fuse the information about the target in the plurality of sensing information sets based on the confidence, to obtain fused information about the target, where confidence of information about a target in sensing information sets of different devices is different. When only one target exists in one sensing information set, and no information about the target exists in other sensing information sets, it is determined whether the target has been tracked at a historical moment. When the target is not tracked at the historical moment, that is, when the intelligent vehicle obtains the information about the target for the first time at the current moment, a motion model is constructed based on the information about the target, information (for example, a position or a speed) about the target at a next moment is predicted based on the motion model, confidence of the prediction information about the target at the next moment is set, and the information about the target, the confidence, and the prediction information about the target at the next moment are recorded into a tracking list. When the target has been tracked at the historical moment, a comparison result is obtained based on prediction information (for example, position information) of the target at the current moment in the tracking list and information about the target in the sensing information set at the current moment, updated confidence is obtained based on the comparison result and confidence that is of the prediction information about the target at the current moment and that is recorded in the tracking list, prediction information about the target at the next moment is obtained based on the information about the target and the motion model, and the target information, the updated confidence, and the prediction information about the target at the next moment are recorded in the tracking list. The fused information (and information that does not need to be fused) of the targets included in the tracking list at the current moment constitutes a fused sensing information set at the current moment. It should be understood that according to the method in this application, a fused sensing information set may be obtained at each moment.

Figure 5A:
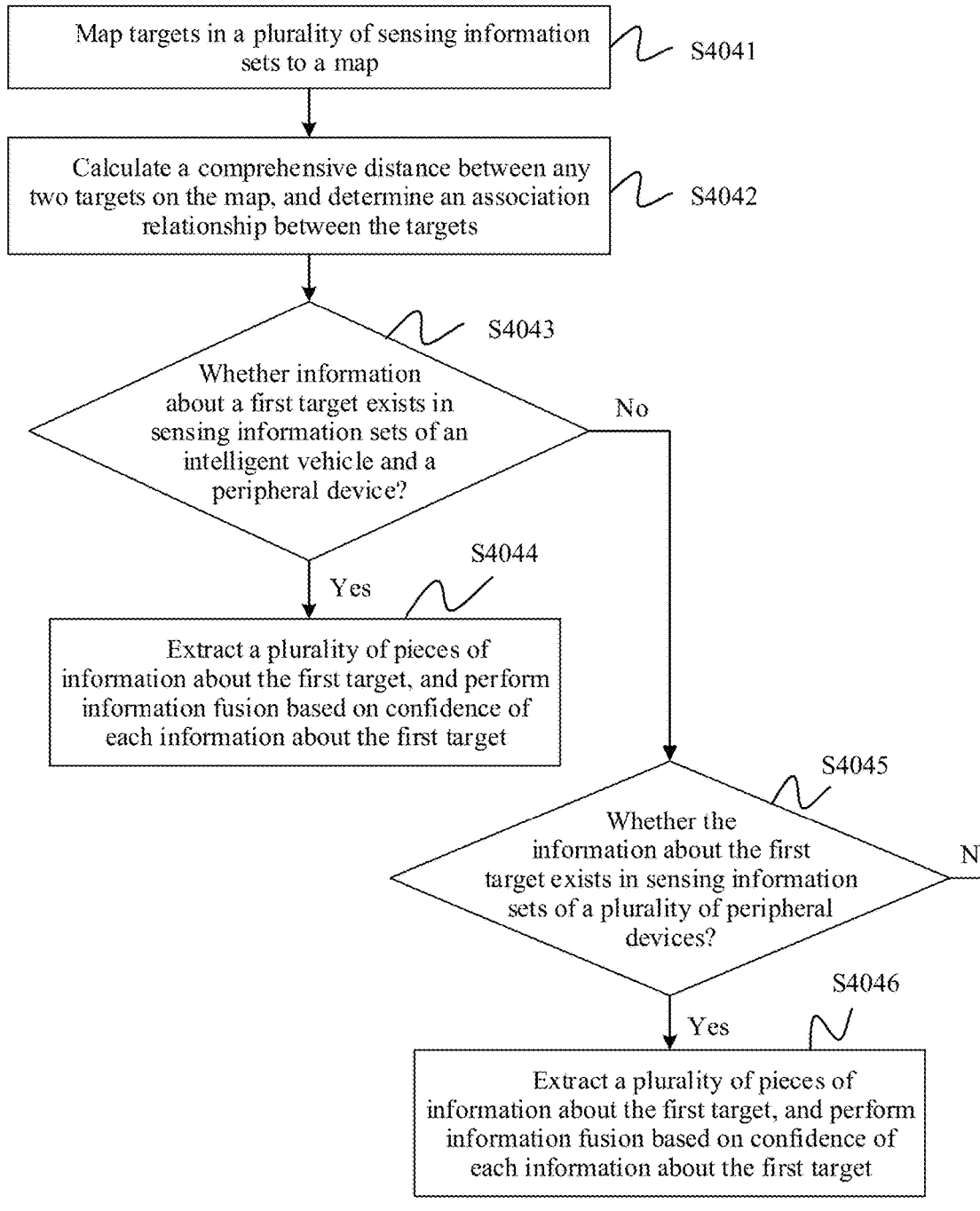
FIG. 5A and FIG. 5B are a flowchart of a method for processing information about a target in a plurality of sensing information sets according to an embodiment of this application.
Figure 5B:
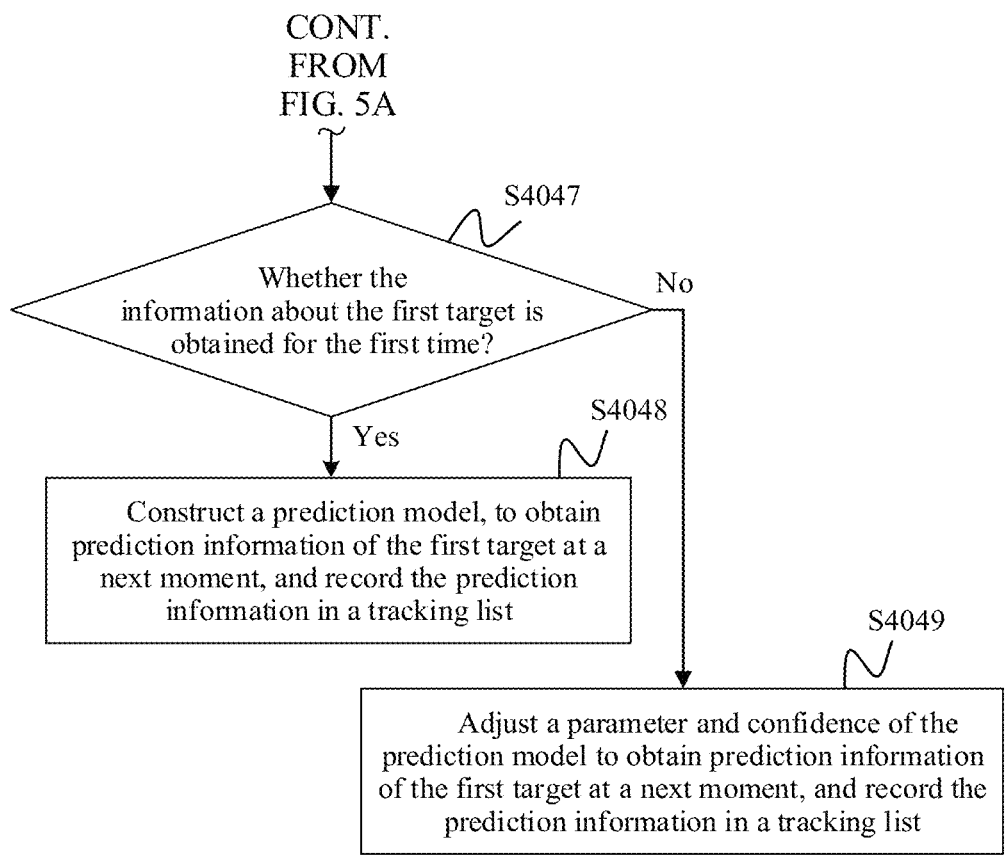

With reference to FIG. 5A and FIG. 5B, the following describes in detail a process of fusing information about targets in a plurality of sensing information sets in an example implementation. It should be understood that an example in which only one target is processed is described as follows. In actual implementation, each target in the sensing information sets is performed as follows.

S4041: Obtain a plurality of sensing information sets, and map targets in each of the plurality of sensing information sets to a map (which may be a global high-definition map, and may be obtained from the map management and vehicle positioning module 1021 in FIG. 3) based on position information about targets in the sensing information sets. After mapping, each target is represented by a position point on the map, and each position point may be associated with other information about the target.

S4042: Calculate a comprehensive distance between any two targets on the map, and determine an association relationship between the targets based on the comprehensive distance and a preset threshold.

Specifically, the comprehensive distances of the any two targets may be represented by a sum of a Euclidean space distance and an attribute distance. The Euclidean space distance is a Euclidean distance value between the two targets that is calculated based on positions of the two targets on the map by using a Euclidean distance calculation formula, and a larger Euclidean space distance indicates a greater distance between the two targets on the map. The attribute distance is used to indicate similarity between information such as types, colors, and postures of two targets. A larger attribute distance indicates a smaller similarity between the two targets. The attribute distance may be calculated by using a mathematical model constructed by using information such as a type, a color, and a posture of a target, or by using a trained deep learning model. This is not limited in this application.

The comprehensive distance between the any two targets is equal to the sum of the Euclidean space distance and the attribute distance between the any two targets. A larger comprehensive distance indicates a smaller possibility that the two targets are the same target sensed by different sensor systems. Therefore, the comprehensive distance between the any two targets is compared with the preset threshold. When the comprehensive distance between the two targets is not less than the preset threshold, the two targets are considered to be different targets, and the information about the two targets is information about different targets on a traffic road that are sensed by the different sensor systems. When the comprehensive distance between the two targets is less than the preset threshold, it is considered that the information about the two targets is information obtained by the different sensor systems (that is, different vehicles or roadside devices) for a same target on an actual traffic road, and a correspondence between the information about the two targets is recorded. For example, a same piece of identification information is set in the information about the two targets.

According to the foregoing method, information that is obtained by an intelligent vehicle and that is of a same target in the plurality of sensing information sets may be associated, so as to facilitate information fusion of the target in a next step. In an embodiment, information corresponding to a same target has same identification information, one or more pieces of other information that also has the identification information may be found in the plurality of sensing information sets based on the identification information in the information about the target, and all the information indicates the same target on the traffic road.

S4043: Read information about a target in a sensing information set obtained from another vehicle or a roadside device (for ease of understanding, the read target may be referred to as a first target, and the information about the read target is referred to as information about the first target), and determine whether the information about the first target also exists in the sensing information set obtained by the intelligent vehicle. (In other words, whether the intelligent vehicle can detect the target may be determined based on the identification information set in S4042, if the intelligent vehicle can detect the target, step S4044 is performed, and if the intelligent vehicle cannot detect the target, step S4045 is performed.)

S4044: When the sensing information set of the another vehicle or the roadside device and the sensing information set of the intelligent vehicle include the information about the first target, extract a plurality of pieces of information about the first target from all sensing information sets including the information about the first target. Each piece of information about the first target comes from a corresponding sensing information set generated by a device. The information about the first target is fused based on confidence of the information about the first target in each sensing information set at the current moment. For example, a weight is set for each piece of extracted information about the first target based on the confidence of the first target, and the plurality of pieces of information about the first target are fused based on the weight of each piece of information about the first target, to obtain fused information about the first target.

The confidence of the information about the first target indicates a degree of trust of the intelligent vehicle on accuracy of the information about the first target that is obtained by different devices. Usually, the sensing information sets received by the intelligent vehicle includes three types: the sensing information set obtained from the roadside device, the sensing information set obtained from a surrounding vehicle, and the sensing information set obtained from a sensor system of the intelligent vehicle.

In some embodiments, it may be considered that confidence is different for sensing information sets from different devices, and confidence is the same for information about targets in sensing information sets obtained by a same device. Therefore, confidence of the sensing information sets of the different devices may be determined, so as to obtain confidence of information about the target.

At a moment, confidence of the sensing information set of each device may be preset or dynamically updated. That confidence of each piece of information about the first target is determined is specifically: A device of a sensing information set to which each piece of information about the first target belongs is determined, and confidence of the sensing information set obtained by the device at a current moment is determined, where the confidence of the information about the first target in the sensing information set is the confidence of the sensing information set. The weight of each information about the first target may be determined based on each piece of confidence of the information about the first target. In this way, a plurality of pieces of information about the first target having respective weights can be obtained, and the weight of each piece of information about the first target may be used to fuse the plurality of pieces of information about the target.

It is worth noting that, from historical experience, the sensor system of the intelligent vehicle has the highest confidence of the sensing information set, and because the sensor system of the roadside device in the surrounding environment of the intelligent vehicle is relatively stable, confidence of the sensing information set sensed by the roadside device in the surrounding environment is higher than that of the sensing information set sensed by a vehicle in the surrounding environment.

The confidence of the sensing information set obtained by the sensor system of the intelligent vehicle may be represented by $W_e$. The confidence of the sensing information set obtained by the vehicle in the surrounding environment of the intelligent vehicle may be represented by $W_a$. The confidence of the sensing information set obtained by the roadside device in the surrounding environment of the intelligent vehicle may be represented by $W_r$. In some embodiments, confidence of sensing information sets of different devices may be preset with reference to the foregoing historical experience. For example, the preset confidence meets the following condition: $W_e>0.5$; $W_r=\beta*W_a$, where $\beta$ is greater than or equal to 1; and $\Sigma W_r+\Sigma W_a+W_e=1$. If the foregoing three conditions are met, confidence of $W_r$, $W_a$, $W_e$ can be determined based on experience.

Optionally, after the confidence of the sensing information sets of the different devices is initially determined based on the experience, confidence of the sensing information sets of the different devices at a subsequent moment may be dynamically determined based on confidence of the sensing information set of each device at a previous moment and a matching degree of information that is about targets in each sensing information set at the previous moment and that is received by the intelligent vehicle and the information about the targets in the fused sensing information set at the previous moment.

A specific method for dynamically determining the confidence is: traversing sensing information sets that are of a roadside device in a surrounding environment and that are received by the intelligent vehicle at the previous moment, and obtaining an intersection set between information about targets in a sensing information set of each roadside device and the information about the targets in the fused sensing information set obtained at the previous moment, to obtain a quantity of pieces of the information about the targets in each intersection set. The obtained quantity of the pieces of the information about the targets in the intersection set is a quantity of successful matching between the information about the targets sensed by the roadside device and the targets in the fused sensing information set.

Then, the sensing information sets that are of the vehicles in the surrounding environment and that are received by the intelligent vehicle at the previous moment are traversed, and an intersection set between information about the targets in the sensing information set of each vehicle and information about the targets in the fused sensing information set is obtained, to obtain a quantity of information about the targets in each intersection set. The obtained quantity of the information about the targets in the intersection set is a quantity of successful matching between the information about the targets sensed by the vehicle and the targets in the fused sensing information set.

Then, an intersection set between the information about the targets that are in the sensing information set and that are sensed by the intelligent vehicle at the previous moment and the information about the targets in the fused sensing information set is calculated, to obtain a quantity of pieces of information about the targets in the intersection set. The obtained quantity of the information about the targets in the intersection set is a quantity of successful matching between the information about the targets sensed by the intelligent vehicle and the targets in the fused sensing information set.

Normalization is performed on all quantities based on a quantity of successfully matched targets in the sensing information sets of each roadside device at a previous moment, a quantity of successfully matched targets in the sensing information sets of each surrounding vehicle, and a quantity of successfully matched targets in the sensing information sets of the intelligent vehicle, so that $\Sigma W_r + \Sigma W_a + W_e = 1$. The confidence of the sensing information set corresponding to each device at the current moment is comprehensively calculated.

Another specific method for dynamically determining the confidence may be: traversing sensing information sets that are of all roadside devices and that are received by the intelligent vehicle at the previous moment, and calculating an average value of comprehensive distances between information about a same target in the sensing information set of each roadside device and the fused sensing information set at the previous moment. For example, if the intelligent vehicle receives, at the previous moment, sensing information sets broadcast by three roadside devices in the surrounding environment, which are respectively a sensing information set H, a sensing information set J, and a sensing information set K, an average value of comprehensive distances between information about a target in the three sensing information sets H, J, and K and information about the same target corresponding to the fused sensing information set is first obtained, so as to obtain an average value of comprehensive distances of the three sensing information sets. The obtained average value of the comprehensive distances may represent a difference value between information about a target sensed by each roadside device and fused information about the same target. Because the fused information about the target is considered to be more credible, if a smaller average value of the comprehensive distances indicates a smaller difference between the information about the target sensed by the roadside device and the fused information about the same target, it may be considered that the information about the targets obtained by the roadside device has relatively high confidence.

Then, sensing information sets that are of all vehicles and that are received by the intelligent vehicle at the previous moment are traversed, and an average value of comprehensive distances between information about a same target sensed in the sensing information set of each vehicle and in the fused sensing information set at the previous moment is calculated.

Then, an average value of comprehensive distances between the information about the target in the sensing information set obtained by the intelligent vehicle at the previous moment and the information about the same target in the fused sensing information set at the previous moment is calculated.

The confidence of the sensing information set broadcast by the vehicle in the surrounding environment, the confidence of the sensing information set broadcast by the roadside device in the surrounding environment, and the confidence of the sensing information set of the self-vehicle are update based on the obtained average value of the comprehensive distances corresponding to the vehicle in the surrounding environment, the average value of the comprehensive distances corresponding to the roadside device in the surrounding environment, and the average value of the comprehensive distances corresponding to the intelligent vehicle. An updating principle is as follows: a higher average value of the comprehensive distances corresponds to lower confidence, and a lower average value of the comprehensive distances corresponds to higher confidence. Overall confidence needs to meet the following requirement: $\Sigma W_r + \Sigma W_a + W_e = 1$. Specific increase and decrease values of confidence data may be determined based on different environments or historical experience. This is not limited in this application.

Therefore, based on a matching degree between the information about the target in the sensing information set of each device at the previous moment and the information corresponding to the same target in the fused sensing information set at the previous moment, and the confidence of the sensing information set of each device at the previous moment, updated confidence of the sensing information set of each device is obtained. The updated confidence of the sensing information set of each device may be used to fuse the information about the targets in the sensing information set of each device that is obtained at the moment.

Each piece of information about the first target may be fused based on the confidence of each piece of information about the first target, to obtain a fused information about the first target.

It should be understood that, in an embodiment, when information fusion is performed on the information about the first target, spatial fusion may be performed on the information about the first target at the current moment. For example, a weight of each piece of information about the first target is determined based on the confidence of each piece of information about the first target in a weighted fusion manner. Further, some pieces of information about the first target are calculated by weighting based on the weight, to obtain the fused information, where the information obtained through weighting calculation may be, for example, position information, orientation information, and speed information. For some pieces of information that cannot be weighted, for example, type information, feature information, and content information, information with a maximum weight is selected as the fused information. The obtained fused information about the first target at the current moment may be used for driving decision and track planning of the intelligent vehicle. The obtained fused information about the first target may be further used to predict a possible position, an orientation, a speed, and the like of the first target in a period of time after the current moment. The obtained fused information about the first target may be added to a tracking list of the intelligent vehicle, where the tracking list of the intelligent vehicle includes fused information that is obtained by the intelligent vehicle and that is of each target at a historical moment and a current moment, and/or prediction information about each target at a future moment.

Optionally, when the information about the first target is fused, multi-layer fusion may be performed on the information about the first target in terms of time and space by using some algorithms. In other words, prediction information about the first target at a current moment and a subsequent moment is obtained based on each piece of information about the first target and a corresponding weight. The multi-layer fusion method may be one or more of existing algorithms used for information fusion, for example. D-S evidence theory, nearest neighbor (nearest neighbor, NN) data association, and Kalman filtering (KF), and Bayes filtering. A specific fusion method is not limited in this application.

The fused information about the first target that is obtained by using the foregoing method may be recorded in a tracking list of the intelligent vehicle.

S4045: When the sensing information set of at least one of the vehicle or the roadside device in the surrounding environment includes the information about the first target, but the sensing information set of the intelligent vehicle does not include the information about the first target, further determine whether all the sensing information sets of the plurality of devices (the vehicles or roadside devices in the surrounding environment) include the information about the first target. If all the sensing information sets of the plurality of devices (the vehicles or roadside devices in the surrounding environment) include the information about the first target, subsequent step S4046 is performed. If not all sensing information sets of the plurality of devices (the vehicles or roadside devices in the surrounding environment) include the information about the first target, subsequent step S4047 is performed.

S4046: If all sensing information sets of the plurality of devices (vehicles or roadside devices in the surrounding environment) include the information about the first target, extract the information about the first target from the sensing information set including the information about the first target, and fuse the information about the first target based on the confidence of the sensing information set to which each piece of information about the first target belongs.

In this case, because the intelligent vehicle cannot sense the information about the first target, when information fusion is performed, the information about the first target can only be obtained from a sensing information set that includes the information about the first target and that is sent by a device in the surrounding environment. When the information about the first target is fused, confidence of the sensing information set that includes the information about the first target needs to be determined, where the confidence of the sensing information set that includes the information about the first target is confidence of the information about the first target in the sensing information set.

In some embodiments, a method for determining the confidence of the sensing information set that includes the information about the first target is similar to the method for determining the confidence in step S4044. Details are not described herein again. Optionally, in some other embodiments, because the intelligent vehicle cannot detect the information about the first target, when an initial value of the obtained confidence of each piece of information about the first target of the vehicle or the roadside device in the surrounding environment is set, a vehicle or a roadside device that is relatively close to the first target in the surrounding environment of the intelligent vehicle may be selected as a primary device, that is, confidence of the first target that is sensed by the device is set to the highest, and an initial value of confidence is sequentially determined based on distances between the first target and remaining devices that can sense the information about the first target, where a sum of confidence of all pieces of the information about the first target is 1.

After the confidence of each piece of the information about the first target is determined, the information about the first target may be fused. For a specific fusion method, refer to the information fusion method in step S4044. Details are not described herein again.

S4047: When the sensing information set of only one device (a vehicle or a roadside device in the surrounding environment) includes the information about the first target, further determine, by searching the tracking list, whether the intelligent vehicle obtains the information about the first target for the first time. If the intelligent vehicle obtains the information about the first target for the first time (that is, no historical information about the first target is recorded in the tracking list), step S4048 is performed. If the intelligent vehicle does not obtain the information about the first target for the first time (that is, the historical information about the first target is recorded in the tracking list), step S4049 is performed. The tracking list is a list in the intelligent vehicle that records fused historical information that is of a target and that is obtained by the intelligent vehicle at a historical moment. Information about the target at the historical moment, confidence of the information about the target, and prediction information about the target in a future time (for example, a next moment) may be recorded in the tracking list.

S4048: If the intelligent vehicle obtains the information about the first target for the first time, construct a prediction model by using the information about the first target. The prediction model may be a motion model, and prediction information about the first target at the next moment is predicted by using the motion model. For example, in a uniform change motion model, the position and the speed of the first target in the information about the first target are substituted into the uniform change motion model to predict information such as a position and a speed of the first target at the next moment, and further obtain direction information about the first target at the next moment through calculation. For information such as a type and a feature of the first target, prediction does not need to be performed. It may be considered that type information and feature information obtained at the next moment are the same as those obtained at the current moment, and prediction does not need to be performed. Confidence can also be set for the prediction model. The information about the first target at the current moment, the prediction information about the first target at the next moment, and the confidence set for the prediction model are recorded in the tracking list.

S4049: When the intelligent vehicle does not obtain the information about the first target for the first time, that is, when the tracking list of the intelligent vehicle includes the historical information about the first target, compare the obtained information about the first target at the current moment with the prediction information about the first target at the current moment that is obtained through prediction based on the prediction model and that is recorded in the tracking list of the intelligent vehicle, update the value of confidence of the prediction model based on a comparison result, and adjust a parameter of the prediction model based on the comparison result.

A specific confidence updating method may be: calculating a position deviation between the information about the first target at the current moment and the prediction information about the first target at the current moment in the tracking list, comparing the position deviation with a preset deviation threshold, and when the position deviation is greater than the preset deviation threshold, reducing confidence of the first target that is recorded in the tracking list, or when the position deviation is less than or equal to the preset deviation threshold, increasing the confidence of the first target that is recorded in the tracking list. A specific confidence adjustment value may be adjusted with a specific proportion based on an offset value between the position deviation and the deviation threshold, or may be adjusted by a specific step based on an empirical value. This is not particularly limited in this application. A parameter value of the prediction model may further be adjusted based on the position deviation, so that prediction accuracy of the adjusted prediction model is higher. A specific adjustment method may vary based on different prediction models, or may be manually adaptively adjusted.

After the parameter value of the prediction model is adjusted, the information about the first target at the next moment may continue to be predicted based on the adjusted prediction model and the obtained information about the first target at the current moment, to obtain the prediction information about the first target at the next moment. The information about the first target at the current moment, the prediction information about the first target at the next moment, and the updated confidence are recorded in the tracking list.

According to the foregoing methods S4041 to S4049, information about a target in the sensing information set that is obtained by the intelligent vehicle from the peripheral roadside device or vehicle may be fused and fused information is recorded in the tracking list of the intelligent vehicle. The intelligent vehicle may directly add, to the tracking list, information about targets only sensed by the intelligent vehicle (no information about the targets recorded in the sensing information set of other peripheral vehicles or roadside devices), and does not need to perform fusion. The intelligent vehicle may also predict the information about the targets at the next moment based on the prediction model. A specific manner is shown in the foregoing S4048. Details are not described herein again.

According to the foregoing information fusion method, different confidence may be allocated to a plurality of pieces of obtained information about a same target sensed by sensor systems of a plurality of devices, and further, the plurality of pieces of information about the same target are fused based on the confidence of each piece of information about the same target. In this way, the intelligent vehicle can obtain more accurate fused information about the target. The foregoing method further records information about a target sensed by only a single peripheral vehicle or a roadside device, information about the target at a next moment is predicted by using the prediction model, and a parameter of the prediction model is continuously adjusted, so that the prediction model is more accurate.

Optionally, in the foregoing process, the roadside device or the vehicle may further send information about the roadside device or the vehicle. Because accuracy of the information about the peripheral roadside device or the vehicle that is sent by the peripheral roadside device or the vehicle is relatively high, in some embodiments, the obtained information about the device that is sent by the device may not be fused with information about the device sensed by another device. Instead, the information about the device that is sent by the device is directly used as the most accurate information obtained about the device.

Optionally, after the foregoing step S404 is performed, the target may be further projected, based on the obtained fused information about the target, to the map obtained by the foregoing map management and vehicle positioning module, to obtain an environment model at the current moment. The environment model can display the position of the target on the map at the current moment and information such as the type, feature, and content of the target in real time. Optionally, the environment model may further display information such as a position of the intelligent vehicle on the map and a distance between the intelligent vehicle and a target in the ROI of the intelligent vehicle. Optionally, the environment model may further display possible information (for example, information such as a position, a speed, and an orientation) of the target in a future time. The environment model may be displayed by a display device, and the environment model may also be sent to another device or system.

In some embodiments, the fused information that is of the target in the surrounding environment of the intelligent vehicle and that is obtained in the foregoing steps S401 to S404 may not only include fused information about the target at the current moment, but may further include information about the target in a future time that is obtained through prediction based on the information about the target at the current moment (for example, a next moment, a next time period). The fused information about the target in the surrounding environment of the intelligent vehicle may be used for track planning of the intelligent vehicle in the future time. The planned driving route of the intelligent vehicle in the future time should not be too close to or overlap with the target in the future time (to avoid collision). Content information about a target in the surrounding environment, for example, red light information, needs to be further considered for the planned driving route of the intelligent vehicle in the future time.

It should be understood that steps S401 to S404 and detailed steps S4041 to S4049 in S404 may be performed at each moment when the intelligent vehicle runs on the traffic road. In this way, the intelligent vehicle can obtain the information about the target in the surrounding environment in real time. It is convenient for the intelligent vehicle to adjust the driving of the intelligent vehicle in real time.

Figure 6:
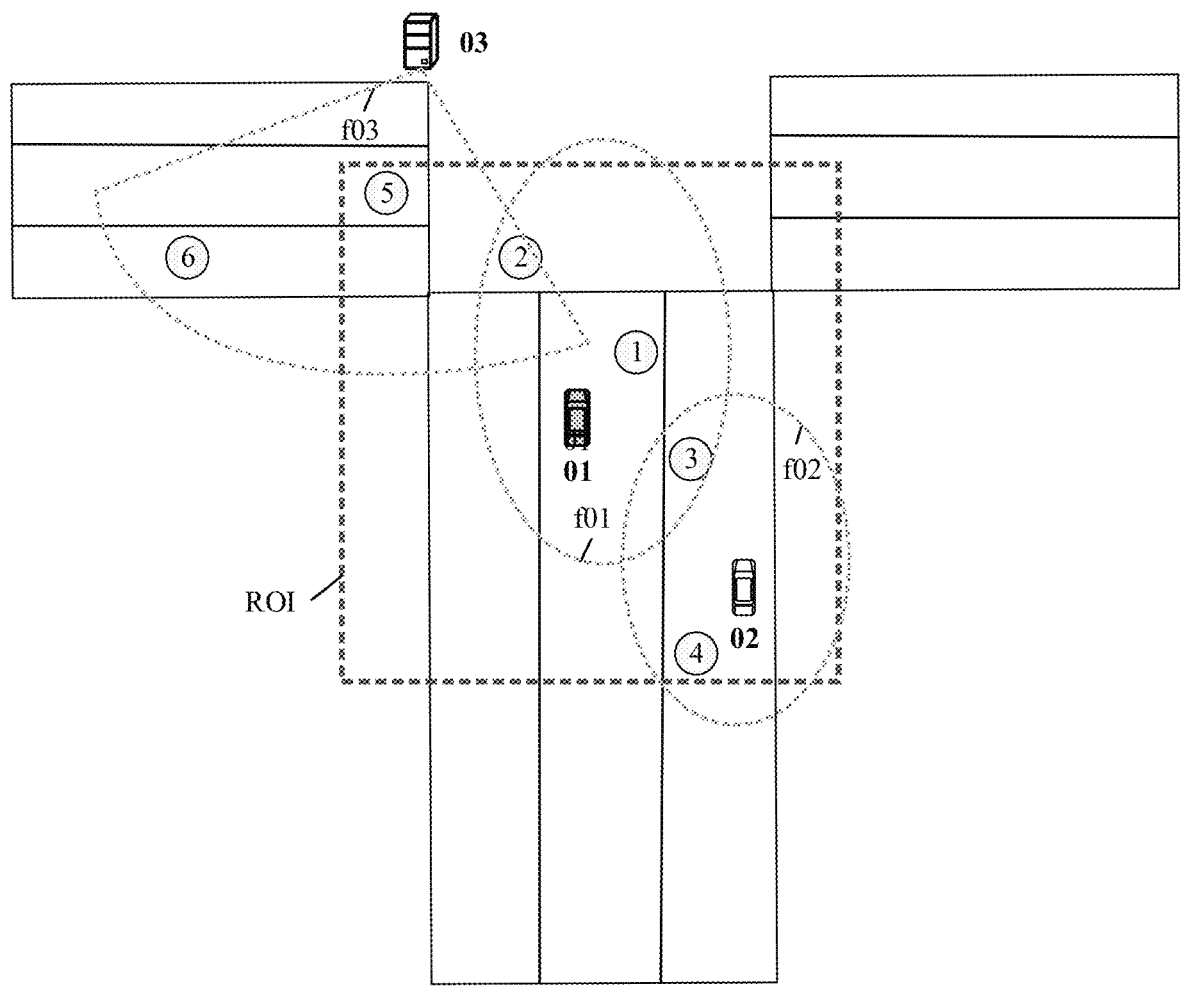
FIG. 6 is an example diagram of an application of processing information about a target in a plurality of sensing information sets according to an embodiment of this application.

To describe more clearly the solutions of performing different processing on different targets described in the foregoing steps S4041 to S4049 in this application, the following provides an example of description with reference to FIG. 6.

As shown in FIG. 6, an intelligent vehicle 01 runs on a traffic road at a current moment, a sensing range of a sensor system of the intelligent vehicle 01 is f01, and a first sensing information set obtained by the intelligent vehicle 01 includes information about targets 1, 2, and 3. The intelligent vehicle 01 may receive a second sensing information set sent by a vehicle 02 and a third sensing information set sent by a roadside device 03 at the current moment. A sensing range of the vehicle 02 is f02, and the sent second sensing information set includes information about the target 3 and a target 4. A sensing range of the roadside device 03 is f03, and the sent third sensing information set includes information about the target 2, a target 5, and a target 6.

According to the foregoing processes of the S4041 to S4049, when information fusion or processing is performed on the target, different targets may be fused or processed according to the foregoing different steps.

For the target 1, information about the target 1 is obtained by sensing only by the intelligent vehicle 01, the information about the target 1 may be added to a tracking list. Information about the target 1 at a next moment may be further predicted based on a prediction model. The prediction information about the target 1 at the next moment is also recorded in the tracking list.

For the target 2, the target 2 may be sensed by the intelligent vehicle 01 and the roadside device 03. Therefore, both the first sensing information set and the third sensing information set include the information about the target 2, and the information about the target 2 is fused by using the foregoing step S4044.

For the target 3, the target 3 may be sensed by the intelligent vehicle 01 and the vehicle 02. Therefore, both the first sensing information set and the second sensing information set include the information about the target 3, and the information about the target 3 is fused by using the foregoing step S4044.

For the target 4, the target 4 is sensed only by the vehicle 02, and the foregoing steps S4047 to S4049 may be performed for processing.

For the target 5, the target 5 is sensed only by the roadside device 03, and the foregoing steps S4047 to S4049 may be performed for processing.

For the target 6, the target 6 is sensed only by the roadside device 03, and the foregoing steps S4047 to S4049 may be performed for processing.

Optionally, in some other embodiments, the intelligent vehicle 01 tracks and records only the targets in the ROI. As shown in FIG. 6, the target 6 is not in the ROI of the intelligent vehicle 01. Therefore, the operations described above may be performed only on the target 1 to the target 5.

Figure 7:
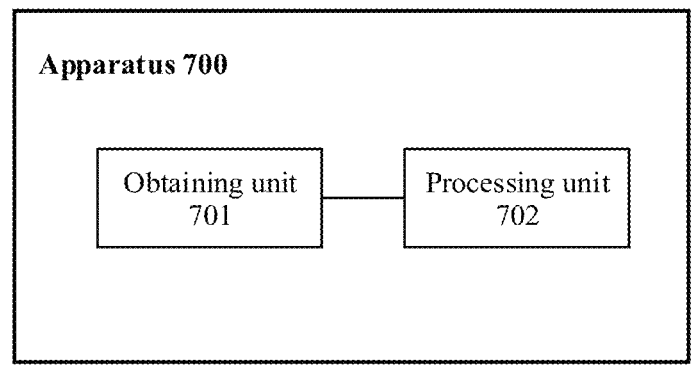
FIG. 7 is a schematic diagram of a structure of an apparatus 700 according to an embodiment of this application.

This application further provides an apparatus 700 shown in FIG. 7. The apparatus 700 may be configured to perform the information fusion method provided in the embodiments of this application. The apparatus 700 includes an obtaining unit 701 and a processing unit 702.

The obtaining unit 701 is configured to obtain a plurality of sensing information sets, where each sensing information set includes information about at least one target, and different sensing information sets come from sensing systems of different devices.

The processing unit 702 is configured to: when at least two sensing information sets in the plurality of sensing information sets include information about a first target, fuse the information about the first target in the at least two sensing information sets, to obtain fused information about the first target.

Optionally, the processing unit is specifically configured to: obtain confidence of the information about the first target in each sensing information set; and fuse the information about the first target in the at least two sensing information sets based on the confidence of the information about the first target in each sensing information set, to obtain the fused information about the first target.

Optionally, the confidence of the information about the first target in each sensing information set is confidence of the corresponding sensing information set. The processing unit is further configured to: calculate a matching degree between information about a target in each sensing information set at a previous moment and fused information about the target corresponding to the sensing information set at the previous moment, and determine confidence of each sensing information set at the current moment based on the matching degree.

Optionally, the confidence of the information about the first target in each sensing information set is confidence of the corresponding sensing information set, and the confidence of each sensing information set is determined by an attribute of a device corresponding to each sensing information set.

Optionally, devices for generating a plurality of sensing information sets include a vehicle communicating with an intelligent vehicle, a roadside device communicating with the intelligent vehicle, and the intelligent vehicle.

Optionally, the processing unit is further configured to: determine a region of interest ROI of the intelligent vehicle based on driving information about the intelligent vehicle; and filter out, based on the ROI, information about a target whose position is not in the ROI in each sensing information set.

Optionally, the processing unit is further configured to: search for a tracking list when only one sensing information set in the plurality of sensing information sets includes the information about the first target: if no historical information about the first target is recorded in the tracking list, construct a prediction model based on the information about the first target, to obtain prediction information about the first target at a next moment: set the confidence of the prediction model; and record, in the tracking list, the information about the first target, the confidence, and the prediction information about the first target at the next moment.

Optionally, the processing unit is further configured to: search for a tracking list when only one sensing information set in the plurality of sensing information sets includes the information about the first target: if historical information about the first target is recorded in the tracking list, compare the information about the first target with prediction information that is of the first target at the current moment and that is recorded in the tracking list, and obtain updated confidence based on a comparison result and confidence of the prediction model recorded in the tracking list: adjust a parameter of the prediction model based on the comparison result to obtain an adjusted prediction model: obtain prediction information about the first target at a next moment based on the information about the first target and an adjusted prediction model; and record, into the tracking list, the information about the first target, the updated confidence, and the prediction information about the first target at the next moment.

Optionally, the processing unit is further configured to obtain a map and status information about the intelligent vehicle: construct an environment model based on the fused information about the first target, the map, and the status information about the intelligent vehicle; and display the environment model.

Optionally, each sensing information set is an information set in a standardized format.

Optionally, the processing unit is further configured to: receive a sensing information set sent by a device communicating with the intelligent vehicle; and perform authentication on the sensing information set, and retain the sensing information set if the sensing information set is authenticated as valid. Authentication can prevent an unauthorized device from sending information to interfere the sensing information sets, so that driving security of the intelligent vehicle is improved.

In some other more specific embodiments, the obtaining unit 701 in the apparatus 700 provided in this embodiment of this application is configured to perform content described in steps S401 and S402. The processing unit 702 is configured to perform content described in the foregoing steps S403 and S404.

Figure 8:
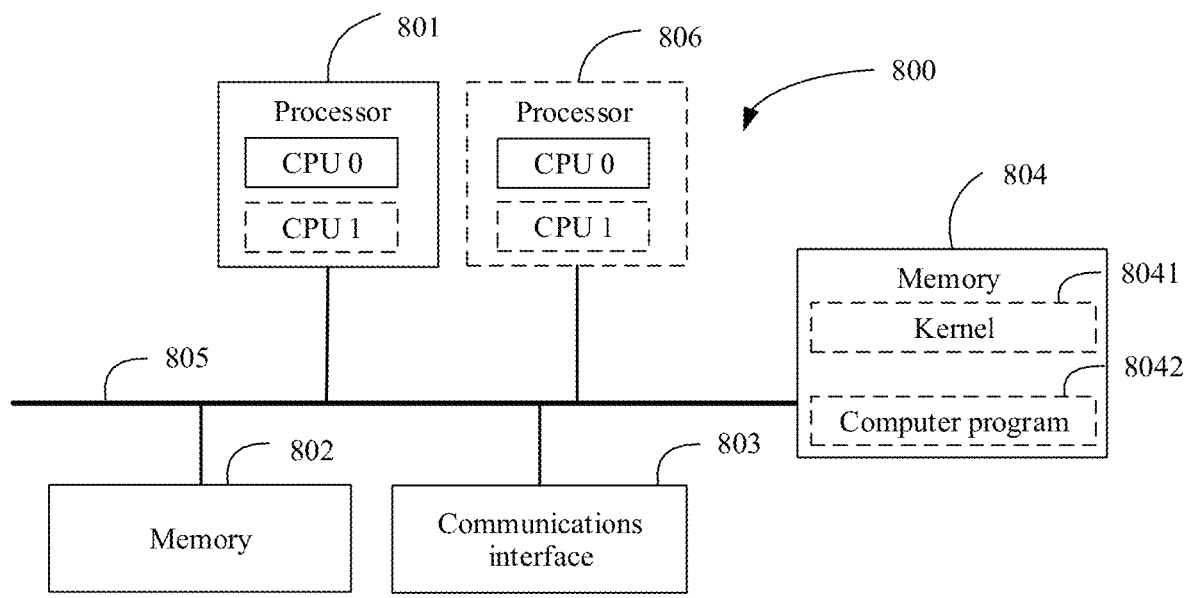
FIG. 8 is a schematic diagram of a structure of a network device 800 according to an embodiment of this application.

This application further provides a device 800. As shown in FIG. 8, the device 800 includes a processor 801, a memory 802, a communications interface 803, and a memory 804, and the device 800 may be a vehicle-mounted device installed in an intelligent vehicle. The processor 801, the memory 802, the communications interface 803, and the memory 804 communicate through the bus 805. The memory 802 is configured to store an instruction, and the processor 801 is configured to execute the instruction stored in the memory 802. The memory 802 stores program code, and the processor 801 may invoke the program code stored in the memory 802, to perform operations of S401 to S404 and/or S4041 to S4049 in the foregoing embodiment, and/or implement a function of the foregoing apparatus 700.

It should be understood that, in this embodiment of this application, the processor 801 may be a CPU, or the processor 801 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, any conventional processor, or the like.

Optionally, the device 800 may include a plurality of processors. For example. FIG. 8 includes a processor 801 and a processor 806. The processor 801 and the processor 806 may be different types of processors, and each type of processor includes one or more chips.

The memory 802 may include a read-only memory and a random access memory, and provide an instruction and data to the processor 801. The memory 802 may further include a non-volatile random access memory. For example, the memory 802 may further store a sensing information set or a tracking list.

The memory 802 may be a volatile memory or a non-volatile memory, or may include both a volatile memory and a nonvolatile memory. The nonvolatile memory may be a read-only memory (ROM), a programmable read-only memory (programmable ROM. PROM), an erasable programmable read-only memory (erasable PROM. EPROM), an electrically erasable programmable read-only memory (electrically EPROM. EEPROM), or a flash memory. The volatile memory may be a random access memory (RAM) that is used as an external buffer. Through example but not limitative description, many forms of RAMs may be used, for example, a static random access memory (static RAM. SRAM), a dynamic random access memory (DRAM), a synchronous dynamic random access memory (synchronous DRAM. SDRAM), a double data rate synchronous dynamic random access memory (double data rate SDRAM. DDR SDRAM), an enhanced synchronous dynamic random access memory (enhanced SDRAM. ESDRAM), a synchlink dynamic random access memory (synchlink DRAM. SLDRAM), and a direct rambus random access memory (direct rambus RAM. DR RAM).

In addition to a data bus, the bus 804 may further include a power bus, a control bus, a status signal bus, and the like. However, for clear description, various types of buses in the figure are marked as the bus 804. Optionally, the bus 804 may alternatively be an in-vehicle Ethernet bus, a controller area network (controller area network. CAN) bus, or another internal bus.

Figure 3:
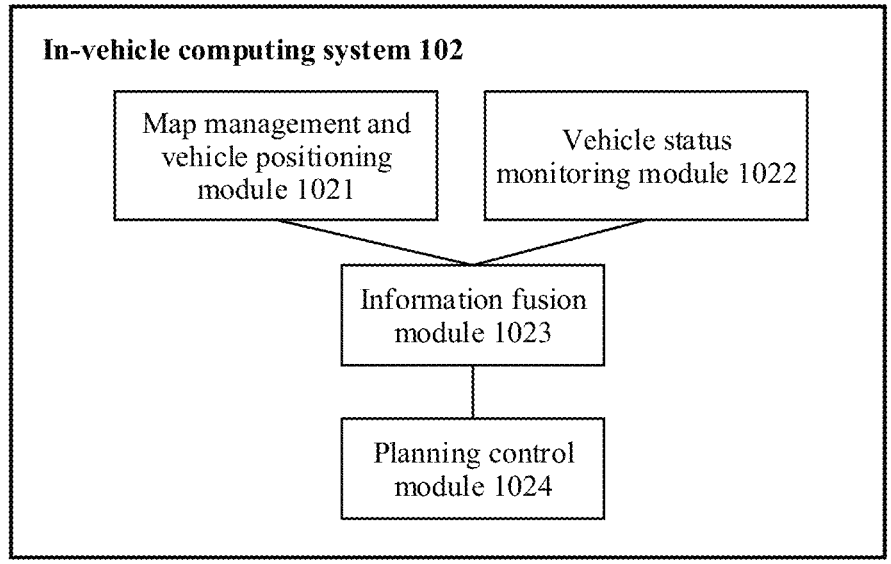
FIG. 3 is a schematic diagram of a structure of an in-vehicle computing system 102 according to an embodiment of this application.

This application further provides the in-vehicle computing system 102 shown in FIG. 3. The in-vehicle computing system 102 may perform the method embodiments shown in FIG. 4, FIG. 5A, and FIG. 5B, or may implement functions of the apparatus 700 shown in FIG. 7.

This application further provides the intelligent vehicle 100 shown in FIG. 1 or FIG. 2. The intelligent vehicle 100 may perform the method embodiments described in FIG. 4, FIG. 5A, and FIG. 5B, or may implement functions of the apparatus 700 shown in FIG. 7.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, the procedure or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the appended drawings, disclosed content, and the appended claims. In the claims, the term "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to this application without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. Clearly, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. An information fusion method, wherein the method is applied to an intelligent vehicle and comprises:
   obtaining a plurality of sensing information sets, wherein each sensing information set of the plurality of sensing information sets comprises information about at least one target and different sensing information sets come from sensing systems of different device types, wherein the different device types generating the plurality of different sensing information sets include a vehicle communicating with the intelligent vehicle, a roadside device communicating with the intelligent vehicle, and the intelligent vehicle; and
   based on at least two sensing information sets in the plurality of sensing information sets comprising information about a first target, fusing the information about the first target in the at least two sensing information sets to obtain fused information about the first target, wherein the fusing the information about the first target in the at least two sensing information sets to obtain fused information about the first target comprises:
   obtaining confidence of the information about the first target in each sensing information set of the plurality of sensing information sets; and fusing the information about the first target in the at least two sensing information sets based on the confidence of the information about the first target in each sensing information set of the plurality of sensing information sets to obtain the fused information about the first target;

wherein the confidence of the information about the first target in each sensing information set of the plurality of sensing information sets is confidence of a corresponding sensing information set, and the method further comprises:

calculating a matching degree between information about a target in each sensing information set of the plurality of sensing information sets at a previous moment and fused information about a target corresponding to a sensing information set at the previous moment, wherein calculating a matching degree includes one of obtaining an intersection set between information about the target in a sensing information set of each device type and the information about the target in the fused sensing information set obtained at the previous moment, or calculating an average value of comprehensive distances between information about the same target in a sensing information set of each device type and the fused sensing information set obtained at the previous moment; and determining confidence of each sensing information set of the plurality of sensing information sets at a current moment based on the matching degree.

2. The method according to claim 1, wherein the confidence of the information about the first target in each sensing information set of the plurality of sensing information sets is confidence of a corresponding sensing information set, and confidence of each sensing information set of the plurality of sensing information sets is determined by an attribute of a device corresponding to each sensing information set of the plurality of sensing information sets.

3. The method according to claim 1, wherein before the fusing of the information about the first target in the at least two sensing information sets, the method further comprises:

determining a region of interest (ROI) of the intelligent vehicle based on driving information about the intelligent vehicle; and filtering out, based on the ROI, information about a target having a position that is not in the ROI in each sensing information set of the plurality of sensing information sets.

4. The method according to claim 1, wherein the method further comprises:

based on only one sensing information set in the plurality of sensing information sets comprising the information about the first target, searching for a tracking list;

based on no historical information about the first target being recorded in the tracking list, constructing a prediction model based on the information about the first target to obtain prediction information about the first target at a next moment;

setting confidence of the prediction model; and recording, into the tracking list, the information about the first target, the confidence, and the prediction information about the first target at the next moment.

5. The method according to claim 1, wherein the method further comprises:

based on only one sensing information set in the plurality of sensing information sets comprising the information about the first target, searching for a tracking list;

based on historical information about the first target being recorded in the tracking list:

comparing the information about the first target with prediction information that is of the first target at a current moment and that is recorded in the tracking list;

obtaining updated confidence based on a comparison result and confidence of a prediction model that is recorded in the tracking list;

adjusting a parameter of the prediction model based on the comparison result, to obtain an adjusted prediction model;

obtaining prediction information about the first target at a next moment based on the information about the first target and the adjusted prediction model; and recording, into the tracking list, the information about the first target, the updated confidence, and the prediction information about the first target at the next moment.

6. The method according to claim 1, wherein the method further comprises:

obtaining a map and status information about the intelligent vehicle;

constructing an environment model based on the fused information about the first target, the map, and the status information about the intelligent vehicle; and displaying the environment model.

7. The method according to claim 1, wherein each sensing information set of the plurality of sensing information sets is an information set in a standardized format.

8. An apparatus, comprising a processor and a memory, wherein the memory stores program code, and the processor executes the program code so that the apparatus performs the following:

obtaining a plurality of sensing information sets, wherein each sensing information set of the plurality of sensing information sets comprises information about at least one target and different sensing information sets come from sensing systems of different device types, wherein the different device types generating the plurality of different sensing information sets include a vehicle communicating with the apparatus, a roadside device communicating with the apparatus, and the apparatus; and based on at least two sensing information sets in the plurality of sensing information sets comprising information about a first target, fusing the information about the first target in the at least two sensing information sets to obtain fused information about the first target, wherein the fusing the information about the first target in the at least two sensing information sets to obtain fused information about the first target comprises:

obtaining confidence of the information about the first target in each sensing information set of the plurality of sensing information sets; and fusing the information about the first target in the at least two sensing information sets based on the confidence of the information about the first target in each sensing information set of the plurality of sensing information sets to obtain the fused information about the first target;

wherein the confidence of the information about the first target in each sensing information set of the plurality of sensing information sets is confidence of a corresponding sensing information set, and the method further comprises:

calculating a matching degree between information about a target in each sensing information set of the plurality of sensing information sets at a previous moment and fused information about a target corresponding to a sensing information set at the previous moment, wherein calculating a matching degree includes one of obtaining an intersection set between information about the target in a sensing information set of each device type and the information about the target in the fused sensing information set obtained at the previous moment, or calculating an average value of comprehensive distances between information about the same target in a sensing information set of each device type and the fused sensing information set obtained at the previous moment; and determining confidence of each sensing information set of the plurality of sensing information sets at a current moment based on the matching degree.

9. The apparatus according to claim 8, wherein the confidence of the information about the first target in each sensing information set of the plurality of sensing information sets is confidence of a corresponding sensing information set, and confidence of each sensing information set of the plurality of sensing information sets is determined by an attribute of a device corresponding to each sensing information set of the plurality of sensing information sets.

10. The apparatus according to claim 8, wherein before the fusing of the information about the first target in the at least two sensing information sets, the processor is further configured to:

determine a region of interest (ROI) of the apparatus based on driving information about the apparatus; and filter out, based on the ROI, information about a target having a position that is not in the ROI in each sensing information set.

11. The apparatus according to claim 8, wherein the processor is further configured to:

based on only one sensing information set in the plurality of sensing information sets comprising the information about the first target, search for a tracking list;

based on no historical information about the first target being recorded in the tracking list, construct a prediction model based on the information about the first target, to obtain prediction information about the first target at a next moment;

set confidence of the prediction model; and record, into the tracking list, the information about the first target, the confidence, and the prediction information about the first target at the next moment.

12. The apparatus according to claim 8, wherein:

based on only one sensing information set in the plurality of sensing information sets comprising the information about the first target, searching for a tracking list;

based on historical information about the first target being recorded in the tracking list:

comparing the information about the first target with prediction information that is of the first target at a current moment and that is recorded in the tracking list;

obtaining updated confidence based on a comparison result and confidence of a prediction model that is recorded in the tracking list;

adjusting a parameter of the prediction model based on the comparison result, to obtain an adjusted prediction model;

obtaining prediction information about the first target at a next moment based on the information about the first target and the adjusted prediction model; and recording, into the tracking list, the information about the first target, the updated confidence, and the prediction information about the first target at the next moment.

13. The apparatus according to claim 8, wherein the processor is further configured to:

obtain a map and status information about the apparatus;

construct an environment model based on the fused information about the first target, the map, and the status information about the apparatus; and display the environment model.

14. The apparatus according to claim 8, wherein each sensing information set of the plurality of sensing information sets is an information set in a standardized format.

15. A non-transitory computer-readable storage medium, wherein the computer-readable storage medium stores computer program code, and when the computer program code is executed by a computing device, the computing device performs the method according to claim 1.

16. A vehicle, wherein the vehicle comprises a memory and a processor, the memory of the vehicle is configured to store a group of computer instructions and a data set, the processor executes the computer instructions stored in the memory, and the processor reads the data set stored in the memory, so that the vehicle is caused to perform the method comprising:

obtaining a plurality of sensing information sets, wherein each sensing information set of the plurality of sensing information sets comprises information about at least one target and different sensing information sets come from sensing systems of different device types, wherein the different device types generating the plurality of different sensing information sets include a second vehicle communicating with the vehicle, a roadside device communicating with the vehicle, and the vehicle; and based on at least two sensing information sets in the plurality of sensing information sets comprising information about a first target, fusing the information about the first target in the at least two sensing information sets to obtain fused information about the first target, wherein the fusing the information about the first target in the at least two sensing information sets to obtain fused information about the first target comprises:

obtaining confidence of the information about the first target in each sensing information set of the plurality of sensing information sets; and fusing the information about the first target in the at least two sensing information sets based on the confidence of the information about the first target in each sensing information set of the plurality of sensing information sets to obtain the fused information about the first target;

wherein the confidence of the information about the first target in each sensing information set of the plurality of sensing information sets is confidence of a corresponding sensing information set, and the method further comprises:

calculating a matching degree between information about a target in each sensing information set of the plurality of sensing information sets at a previous moment and fused information about a target corresponding to a sensing information set at the previous moment, wherein calculating a matching degree includes one of obtaining an intersection set between information about the target in a sensing information set of each device type and the information about the target in the fused sensing information set obtained at the previous moment, or calculating an average value of comprehensive distances between information about the same target in a sensing information set of each device type and the fused sensing information set obtained at the previous moment; and determining confidence of each sensing information set of the plurality of sensing information sets at a current moment based on the matching degree.

* * * * *